United States Patent
Doi

(10) Patent No.: US 10,621,010 B2
(45) Date of Patent: Apr. 14, 2020

(54) INFORMATION PROCESSING APPARATUS AND MIGRATION METHOD

(71) Applicant: FUJITSU LIMITED, Kawasaki-shi, Kanagawa (JP)

(72) Inventor: Tsunehisa Doi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 15/786,653

(22) Filed: Oct. 18, 2017

(65) Prior Publication Data

US 2018/0150335 A1 May 31, 2018

(30) Foreign Application Priority Data

Nov. 29, 2016 (JP) .................................. 2016-231186

(51) Int. Cl.
*G06F 9/50* (2006.01)
*G06F 11/14* (2006.01)
(Continued)

(52) U.S. Cl.
CPC ........ *G06F 9/5088* (2013.01); *G06F 11/1484* (2013.01); *G06F 11/2038* (2013.01);
(Continued)

(58) Field of Classification Search
None
See application file for complete search history.

(56) References Cited

U.S. PATENT DOCUMENTS 8,893,123 B2 * 11/2014 Miyamoto .......... G06F 9/45533
718/1
9,055,119 B2 * 6/2015 Zhou ................... H04L 67/2847
(Continued)

FOREIGN PATENT DOCUMENTS

JP      2014-178981      9/2014
JP      2014-191752      10/2014
(Continued)

OTHER PUBLICATIONS

Senthil Nathan et al., "Resource Availability Based Performance Benchmarking of Virtual Machine Migrations", Proceedings of the 4th ACM/SPEC International Conference on Performance Engineering (ICPE '13), Apr. 21-24, 2013 (12 pages).
(Continued)

*Primary Examiner* — Daxin Wu
(74) *Attorney, Agent, or Firm* — Fujitsu Patent Center

(57) ABSTRACT

A processor in a first information processing apparatus reads out data stored in a unit area of a memory used by a virtual machine and copies the data to a second information processing apparatus. The processor performs control for storing a modification history record in a buffer area allocated in association with the unit area, each time a modification is made to data in the unit area during a period after the copying. When the amount of modification history records in the buffer area exceeds a threshold, the processor recopies data stored in the unit area to the second information processing apparatus, in preparation for operation of the virtual machine on the second information processing apparatus. When the amount of modification history records does not exceed the threshold, the processor transmits the modification history records to the second information processing apparatus.

11 Claims, 18 Drawing Sheets

(51) Int. Cl.
*G06F 11/20* (2006.01)
*G06F 11/30* (2006.01)

(52) U.S. Cl.
CPC ........ *G06F 11/301* (2013.01); *G06F 11/3037* (2013.01); *G06F 11/3089* (2013.01); *G06F 11/2097* (2013.01); *G06F 2201/81* (2013.01)

(56) References Cited

U.S. PATENT DOCUMENTS

| | | | |
|---|---|---|---|
| 9,110,702 B2* | 8/2015 | Reuther | G06F 9/45558 |
| 9,454,445 B2* | 9/2016 | Miyajima | G06F 11/1484 |
| 9,626,212 B2* | 4/2017 | Beveridge | G06F 16/273 |
| 9,672,120 B2* | 6/2017 | Tarasuk-Levin | G06F 11/2023 |
| 9,898,320 B2* | 2/2018 | Tarasuk-Levin | G06F 9/45558 |
| 2004/0024921 A1* | 2/2004 | Peake, Jr. | G06F 11/3485 710/1 |
| 2008/0059542 A1* | 3/2008 | Atluri | G06F 11/1471 |
| 2013/0304903 A1* | 11/2013 | Mick | H04L 43/0817 709/224 |
| 2014/0108854 A1* | 4/2014 | Antony | G06F 11/203 714/4.2 |
| 2014/0281674 A1* | 9/2014 | Miyajima | G06F 11/1484 714/4.11 |
| 2014/0298333 A1* | 10/2014 | Yoshida | G06F 9/5088 718/1 |
| 2014/0298338 A1* | 10/2014 | Doi | G06F 9/4856 718/1 |
| 2015/0378847 A1* | 12/2015 | Tarasuk-Levin | G06F 11/1658 714/19 |
| 2016/0224371 A1* | 8/2016 | Ramanathan | G06F 9/4856 |
| 2017/0242756 A1* | 8/2017 | Arroyo | G06F 11/1451 |
| 2018/0024854 A1* | 1/2018 | Wang | G06F 9/5088 718/1 |

FOREIGN PATENT DOCUMENTS

| | | |
|---|---|---|
| WO | 2012/063334 | 5/2012 |
| WO | 2016/013098 | 1/2016 |

OTHER PUBLICATIONS

Senthil Nathan et al., "Towards a Comprehensive Performance Model of Virtual Machine Live Migration", Proceedings of the ACM Symposium on Cloud Computing 2015 (SoCC '15), Aug. 27-29, 2015 (14 pages).

Senthil Nathan et al., "On Selecting the Right Optimizations for Virtual Machine Migration", Proceedings of the 12th ACM SIGPLAN/SIGOPS International Conference on Virtual Execution Environments (VEE '16), Apr. 2-3, 2016 (13 pages).

Mario Smarduch et al., "Enhanced Live Migration for Intensive Memory Loads", LinuxCon Japan 2015, Jun. 3-5, 2015 (22 pages).

* cited by examiner

FIG. 10

TLB TABLE 144

| PHYSICAL PAGE NUMBER | WRITE-INHIBITED FLAG | MONITOR FLAG | BUFFER-FULL FLAG | BUFFER ADDRESS | BUFFER MODE | BUFFER SIZE |
|---|---|---|---|---|---|---|
| 1001 | 0 | 1 | 0 | adr#1 | TYPE1 | SIZE1 |
| 1002 | 0 | 1 | 1 | adr#2 | TYPE1 | SIZE1 |
| 1003 | 0 | 1 | 0 | adr#3 | TYPE1 | SIZE1 |
| ... | ... | ... | ... | ... | ... | ... |

FIG. 14 RECORD MODIFICATION HISTORY

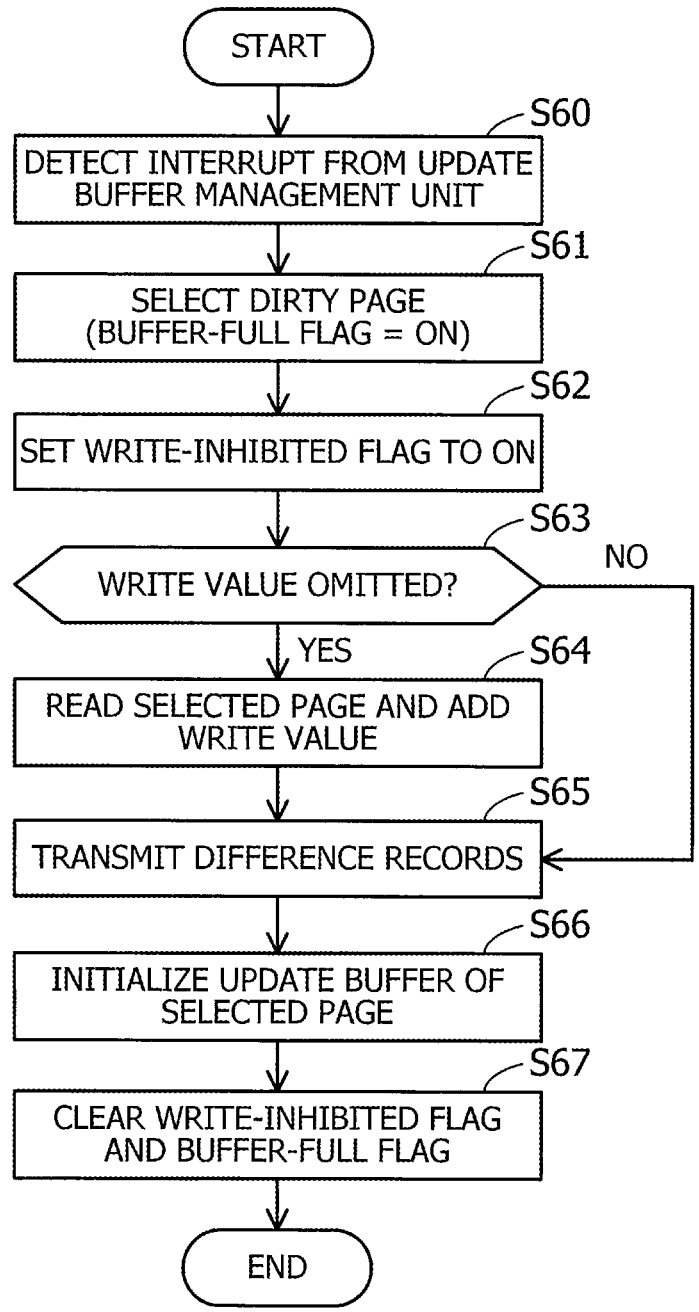

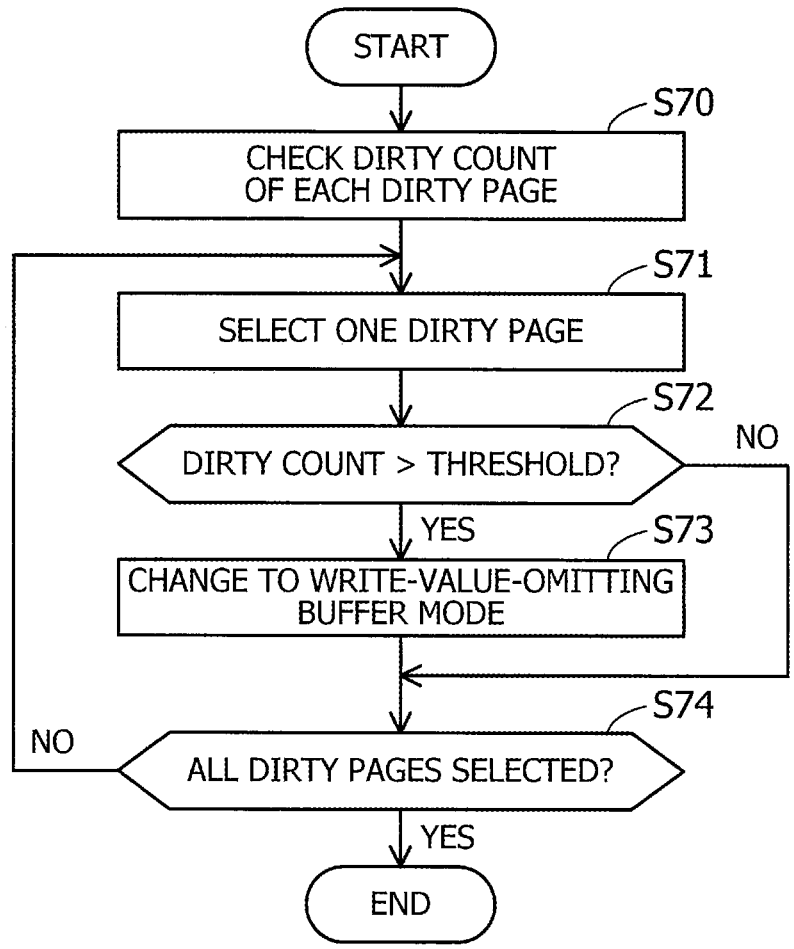
FIG. 17 CHANGE BUFFER MODE

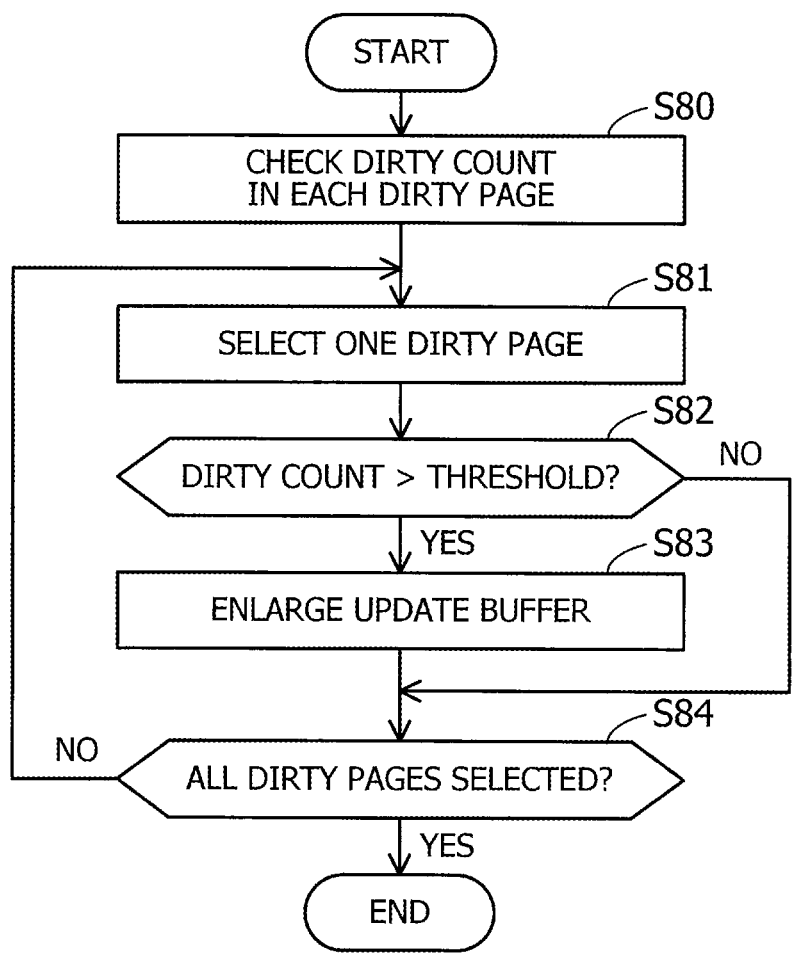

INFORMATION PROCESSING APPARATUS AND MIGRATION METHOD

CROSS-REFERENCE TO RELATED APPLICATION

This application is based upon and claims the benefit of priority of the prior Japanese Patent Application No. 2016-231186, filed on Nov. 29, 2016, the entire contents of which are incorporated herein by reference.

FIELD

The embodiments discussed herein relate to an information processing apparatus and a migration method.

BACKGROUND

Virtualization technology has been used to construct and run virtual computers (virtual machines) on a physical computer platform (physical machine). The computer virtualization allows flexible allocation of a physical machine's processor performance, memory space, and other resources to virtual machines, thus facilitating usage management of hardware resources.

In some cases, there may be a need for moving a virtual machine from its current host physical machine to a different physical machine. For example, some virtual machines may be relocated to a new physical machine when their current physical machine is under a heavy load and thus confronting a likely shortage of available hardware resources. Another case is when the current physical machine has to stop for the purpose of maintenance work or power saving. In this case, all existing virtual machines are moved to a different physical machine.

Live migration is one of the known methods of moving virtual machines between different physical machines. This particular method moves a running virtual machine without shutting down its operating system (OS) or application software, thus minimizing the substantial down-time of the virtual machine. For example, the process of live migration proceeds as follows.

First, the source physical machine copies data from its memory area to the destination physical machine in a page-by-page fashion. Here the term "page" refers to a unit memory area used by the moving virtual machine. As the virtual machine is still operating on the source physical machine, the existing data in pages may be modified by the virtual machine during the period of delivering a copy of all page data to the destination physical machine. If some pages encounter such modifications after their copy is transmitted, then it means that another copy of the modified pages (called "dirty pages") has to be sent to the destination physical machine. The source physical machine recopies page data repetitively until the number of remaining dirty pages becomes sufficiently small.

The source physical machine then stops the virtual machine under migration, not to allow further page modification, and copies the remaining dirty pages to the destination physical machine. The source physical machine also sends the processor context, including the current values of program counter and other registers, to the destination. The destination physical machine loads the received page data in memory and restores the received processor context in the processor, thus permitting the virtual machine to resume its information processing operation. In other words, the destination physical machine takes over the stopped tasks from the source physical machine.

As an example of related art, there is proposed a fault tolerant server that runs a working virtual machine and a protection virtual machine. The memory space of the working virtual machine is divided into a first group of sub-areas and a second group of sub-areas. The proposed fault tolerant server temporarily stops the working virtual machine when a checkpoint is reached. During this temporary stop period, the fault tolerant server copies modified data in the first-group sub-areas to a transfer buffer, where the "modified data" denotes the portions that were modified after the previous checkpoint. Here, the fault tolerant server disables write operations in the second-group sub-areas and copies their modified data after the working virtual machine is released from the temporary stop. The fault tolerant server then transmits the data in the transfer buffer to the protection virtual machine.

Another example is a cloud system that provides a live migration capability for virtual machines. In this proposed cloud system, the source physical machine measures the modification rate of each page (i.e., how frequently the page data is modified). The cloud system copies page data from the source physical machine to the destination physical machine in ascending order of the modification rates. That is, the pages with less frequent modifications are copied earlier than pages with frequent modifications.

Yet another example is a computer system that allows selection of memory areas for use in the destination physical machine. According to this computer system, the source physical machine detects a memory area that has been modified by some programs and sends information about the detected memory area to the destination physical machine. The destination physical machine places this modified data in a memory area that provides the best access performance. See, for example, the following documents:

Japanese Laid-open Patent Publication No. 2014-178981
Japanese Laid-open Patent Publication No. 2014-191752
International Publication Pamphlet No. WO2016/013098

As previously described, the live migration includes the step of recopying modified memory data. Since a page is the minimum unit of recopying, even a small change of page data puts the page into the recopy queue. If some virtual machine repetitively performs such small-size write operations across distributed pages, the resulting increase in the page dirtying rate could disturb the execution of live migration.

The recopying of page data may be repeated until the remaining dirty pages become sufficiently few. This means, however, that the source physical machine keeps missing the chance of stopping the virtual machine, thus making it difficult to complete the live migration. While it may be possible to abandon the recopying for successful completion of live migration, this option would end up with a large number of remaining dirty pages, and the live migration process has thus to spend a long time to transmit memory data after the virtual machine is stopped. The substantial down-time of the virtual machine would be elongated due to the long transmission period, and the availability of the same is consequently degraded.

SUMMARY

In one aspect, there is provided a non-transitory computer-readable storage medium storing a program that causes a first computer to perform a procedure including:

copying, to a second computer, data stored in a unit area of a memory used by a virtual machine; creating a buffer area in association with the unit area; performing control for storing a modification history record in the buffer area associated with the unit area, each time a modification is made to data stored in the unit area during a period after the copying; recopying data stored in the unit area to the second computer, in preparation for operation of the virtual machine on the second computer, when an amount of modification history records in the buffer area exceeds a threshold; and transmitting the modification history records in the buffer area to the second computer, in preparation for operation of the virtual machine on the second computer, when the amount of the modification history records in the buffer area is equal to or smaller than the threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a TLB table;

FIG. 16 is a flowchart illustrating a procedure of advance transmission of difference records by way of example;

FIG. 17 is a flowchart illustrating a procedure of changing buffer mode by way of example; and FIG. 18 is a flowchart illustrating a procedure of changing buffer size by way of example.

DESCRIPTION OF EMBODIMENTS

Several embodiments will be described below with reference to the accompanying drawings.

(a) First Embodiment

Figure 1:
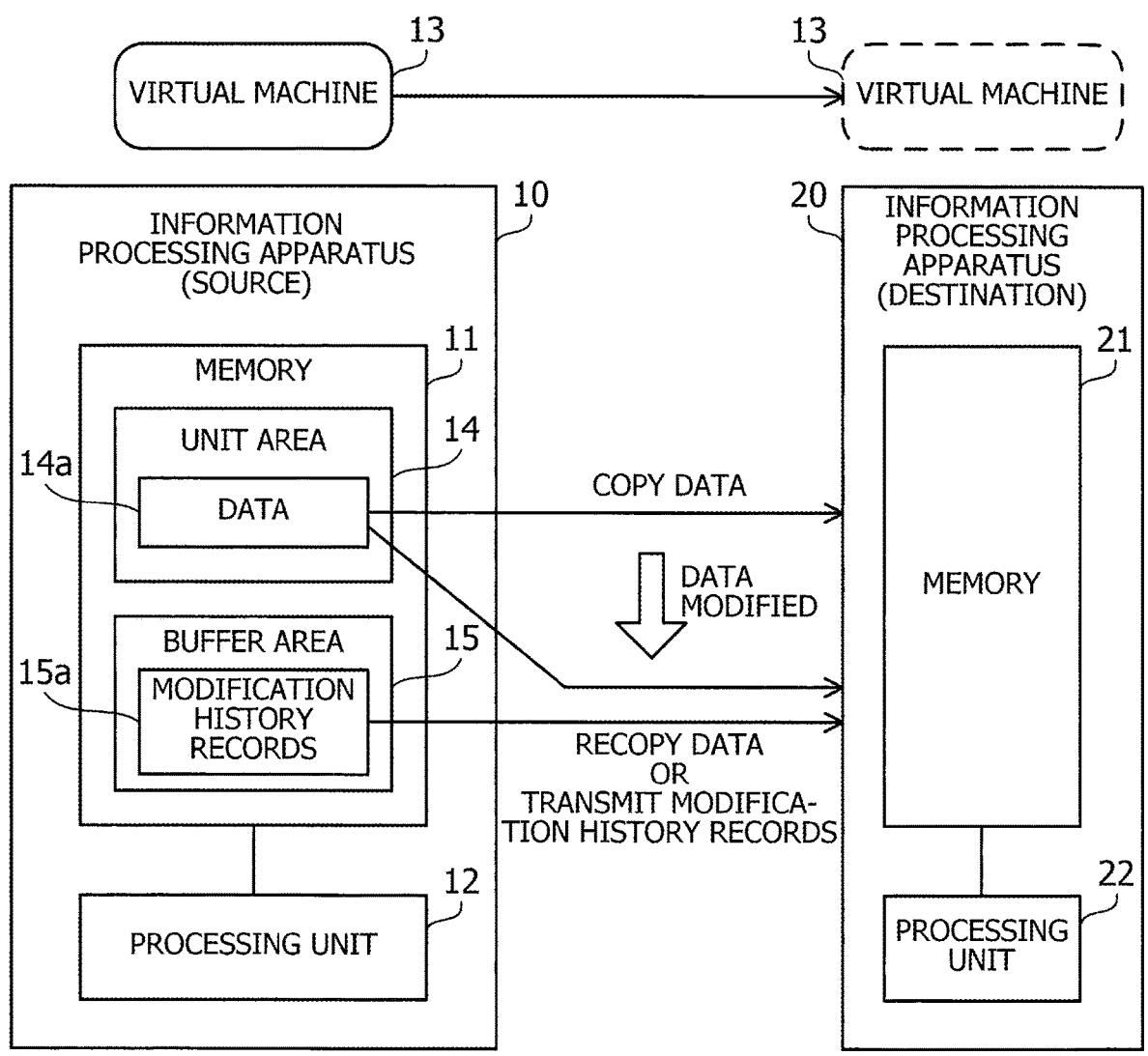
FIG. 1 illustrates an example of an information processing system according to a first embodiment.

This part of the description explains a first embodiment. FIG. 1 illustrates an example of an information processing system according to a first embodiment. The illustrated information processing system includes two information processing apparatuses 10 and 20. These information processing apparatuses 10 and 20 are physical machines, each capable of running one or more virtual machines. For example, the information processing apparatuses 10 and 20 may be server devices deployed in a data center or other information processing facilities. Both information processing apparatuses 10 and 20 have a connection to a network (not illustrated). The first embodiment performs live migration to move a virtual machine 13 from its current information processing apparatus 10 (source) to a new information processing apparatus 20 (destination) without shutting down the OS or applications.

The source information processing apparatus 10 has a memory 11 and a processing unit 12. The destination information processing apparatus 20 also has a memory 21 and a processing unit 22. The memories 11 and 21 may be, for example, random access memories (RAM) or other volatile semiconductor memory devices. The processing units 12 and 22 are processors, such as central processing units (CPU). The processing units 12 and 22 may include digital signal processors (DSP), application-specific integrated circuits (ASIC), field-programmable gate arrays (FPGA), or other electronic circuits, or any combination of them. These processors execute programs, including a migration program (described later), stored in RAM or other storage devices. A set of processors may be referred to as a "multiprocessor" or simply a "processor."

Referring to the source information processing apparatus 10, one unit area 14 of its memory 11 is allocated to a virtual machine 13. For example, this unit area 14 is actually a memory space with a predetermined size, called a "page," in the memory 11. The virtual machine 13 may modify a part or whole of data 14a stored in the unit area 14 while it is running on the source information processing apparatus 10. Although FIG. 1 illustrates only one unit area 14, the virtual machine 13 may be allocated more such unit areas.

To move the running virtual machine 13 from the source information processing apparatus 10 to the destination information processing apparatus 20, the processing unit 12 first copies entire data 14a in the unit area 14 to the destination information processing apparatus 20. In the case where two or more unit areas are allocated to the virtual machine 13, the processing unit 12 copies data in each such unit area to the information processing apparatus 20. These copy operations are called "pre-copy" since they are performed before the processing unit 12 stops the virtual machine 13. As it is still running, the virtual machine 13 may modify the data 14a, wholly or partly, even after the pre-copy from the unit area 14 is done.

The processing unit 12 creates a buffer area 15 in association with the unit area 14 by allocating a storage space of the memory 11 or other storage device in the information processing apparatus 10. When the virtual machine 13 has two or more allocated unit areas, the processing unit 12 allocates a buffer area for each of those unit areas. In that case, different buffer areas are prepared for different unit areas.

Once the first copy of data 14a is finished, the processing unit 12 controls the buffer area 15 so as to generate and store a modification history record 15a in the buffer area 15 each time a modification is made to the data 14a in the unit area 14. When the virtual machine 13 has two or more allocated unit areas, each of their corresponding buffer areas accommodate modification history records. Specifically, modification history records 15a are formed from offset, write size, write value, and other data fields. The offset is a relative address measured with respect to the top of the unit area 14 and indicates where the write value was written. Some modification history records may omit write size or write value, or even both of them. The mechanism of storing modification history records 15a is implemented using hardware for monitoring access to the memory 11.

In preparation for operation of the virtual machine 13 on the destination information processing apparatus 20, the processing unit 12 determines whether the amount of modification history records 15a in the buffer area 15 exceeds a specified first threshold. When the amount of modification history records 15a exceeds the first threshold, the processing unit 12 copies entire data 14a again from the unit area 14 to the destination information processing apparatus 20. When the amount of modification history records 15a does not exceed the first threshold, the processing unit 12 sends the modification history records 15a to the destination information processing apparatus 20, instead of copying the data 14a. In the case where the virtual machine 13 has two or more allocated unit areas, the processing unit 12 determines which option to take on an individual unit area basis. For example, the above selective execution of re-copying data 14a or transmitting modification history records 15a takes place after the source information processing apparatus 10 has stopped operation of its virtual machine 13. This act of copying after stoppage of virtual machines may be called "stop-copy."

During the time between making initial copy of data 14a and stopping the virtual machine 13, the processing unit 12 does not consider the unit area 14 "dirty" unless the amount of modification history records 15a exceeds the first threshold. It is only when the amount of modification history records 15a exceeds the first threshold that the processing unit 12 finds the unit area 14 to be dirty and either copies entire data 14a again or transmits modification history records 15a before stopping the virtual machine 13. The processing unit 12 determines when to stop the virtual machine 13, based on whether each pertaining unit area is dirty. Once the virtual machine 13 is stopped, the processing unit 12 selects either recopying data 14a or transmitting modification history records 15a, depending on the amount of modification history records 15a as discussed above.

In the destination information processing apparatus 20, the processing unit 22 receives data 14a in the course of pre-copy from the source information processing apparatus 10. The processing unit 22 stores the received data 14a in a unit area in the memory 21 that corresponds to the unit area 14 in the source information processing apparatus 10. The processing unit 22 may further receive new data 14a in stop-copy from the source information processing apparatus 10 and overwrite the unit area in the memory 21 with the received new data 14a. The processing unit 22 may also receive modification history records 15a in stop-copy from the information processing apparatus 10 and re-execute the write operations on the unit area in the memory 21 as the received modification history records 15a indicate. These operations enable the destination memory 21 to reflect therein the state of the source memory 11 at the moment when the virtual machine 13 is stopped. The processing unit 22 then causes the virtual machine 13 to resume on the destination information processing apparatus 20.

The first embodiment has been described above. The proposed information processing system includes an information processing apparatus 10 that generates and stores modification history records 15a in a buffer area 15 so as to record each modification made to at least part of data 14a in its corresponding unit area 14 after the initial copy is done with the data 14a. When the modification history records 15a have accumulated to a certain level, the information processing apparatus 10 recopies data 14a to the destination information processing apparatus 20. When the accumulation stays in a low level, the information processing apparatus 10 sends the modification history records 15a to the destination information processing apparatus 20.

The above features of the first embodiment facilitate live migration of a virtual machine 13 since it reduces memory data that needs to be transferred. The live migration process stops the virtual machine 13 in the original information processing apparatus 10 and restarts the same on a new information processing apparatus 20. The first embodiment reduces the amount of data that is transferred during the live migration process, thus shortening the substantial downtime of the virtual machine 13. The noted reduction of post-stoppage data transfer also allows stopping the virtual machine 13 at an earlier point in time. The first embodiment contributes in this way to successful completion of live migration.

(b) Second Embodiment

Figure 2:
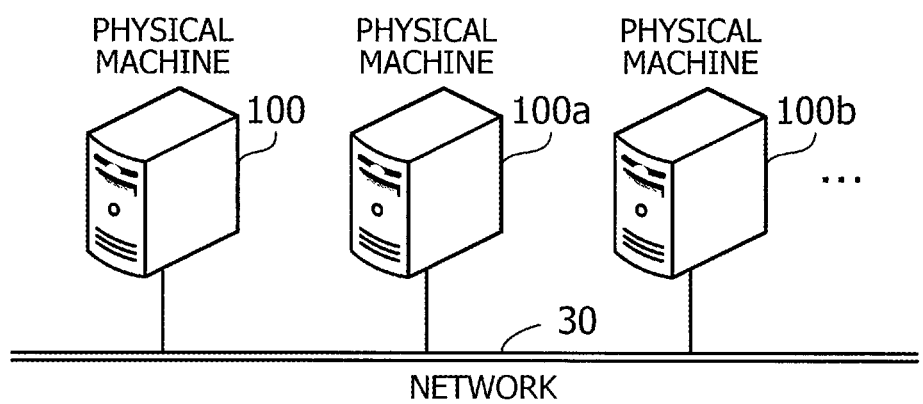
FIG. 2 illustrates an example of an information processing system according to a second embodiment.

This part of the description explains a second embodiment. FIG. 2 illustrates an example of an information processing system according to a second embodiment. The illustrated information processing system of FIG. 2 includes a plurality of physical machines 100, 100a, 100b, and so on, each connected to a network 30.

The physical machines 100, 100a, and 100b are server computers capable of running one or more virtual machines on each. To this end, the physical machine 100, 100a, and 100b execute their respective hypervisors as management software for virtual machines. Other kinds of management software (e.g., virtualization software package for host OS) may be used as an alternative to hypervisors. The hypervisor running on a physical machine allocates hardware resources (e.g., CPU and RAM) to virtual machines. Using the allocated hardware resources, the virtual machines execute various software programs, such as OS, middleware, and applications.

The information processing system allows a virtual machine to migrate from one physical machine to another physical machine without the need for stopping the system's operation. One example is when some physical machine currently hosting virtual machines encounters exhaustion of hardware resources in the middle of its operation. In this case, the information processing system may move some of those virtual machines to other physical machines so as to distribute the load. Another example is when one of the physical machines in the system needs some maintenance work. In this case, the system may stop that physical machine after moving its virtual machines to other physical machines. Yet another example is when the system needs to reduce active physical machines for the purpose of saving energy. In this case, the system selects which physical machines to stop and moves all of their virtual machines to other physical machines.

Figure 3:
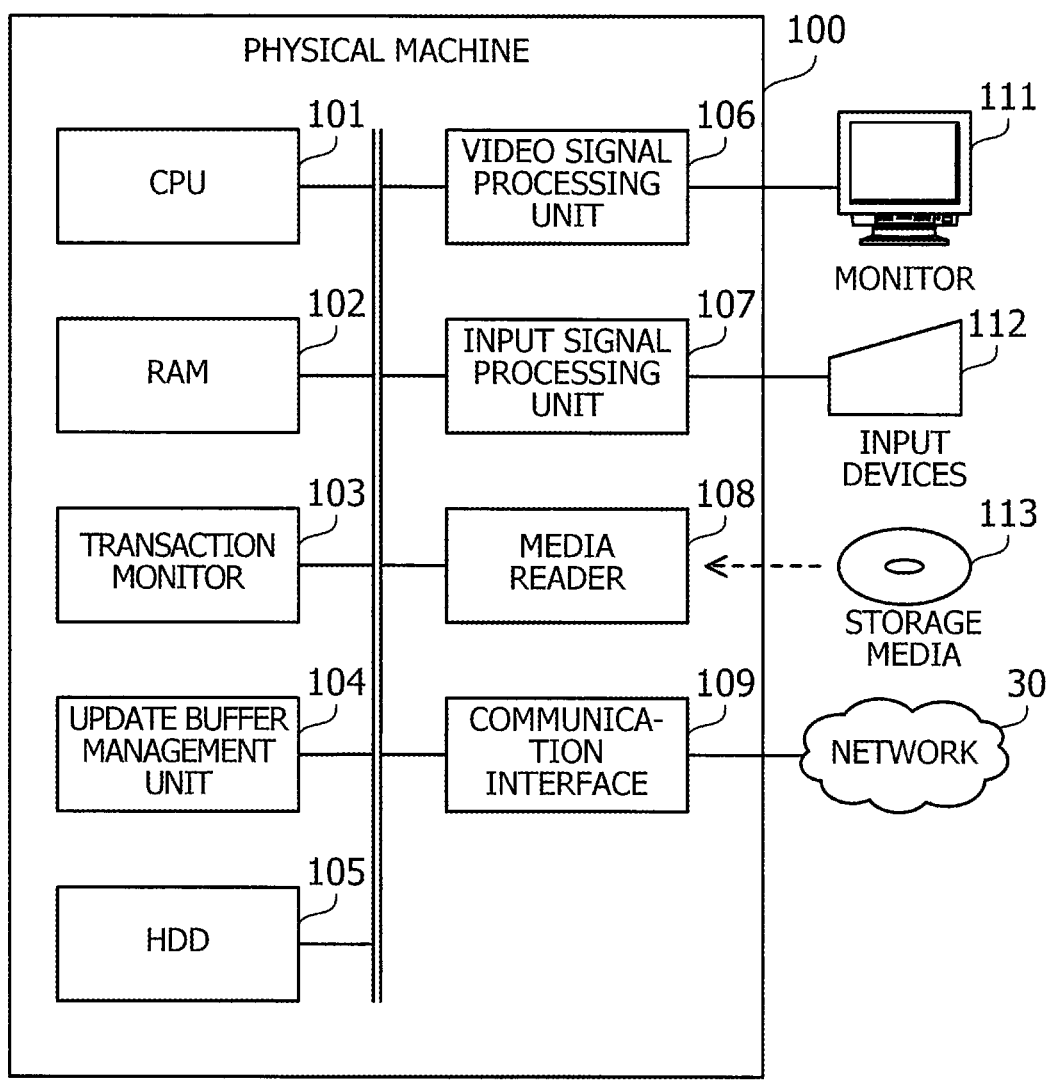
FIG. 3 is a block diagram illustrating a hardware configuration of physical machines by way of example.

FIG. 3 is a block diagram illustrating a hardware configuration of physical machines by way of example. The illustrated physical machine 100 includes a CPU 101, a RAM 102, a transaction monitor 103, an update buffer management unit 104, a hard disk drive (HDD) 105, a video signal processing unit 106, an input signal processing unit 107, a media reader 108, and a communication interface 109.

The CPU 101 is a processor containing computational circuits to execute programmed instructions. The CPU 101 reads at least part of program and data files stored in the HDD 105 and executes programs after loading them on the RAM 102. The CPU 101 may include a plurality of processor cores, and the physical machine 100 may include two or more processors. These processors or processor cores may be used to execute multiple processing tasks (described later) in parallel. A set of processors may be referred to as a "multiprocessor" or simply a "processor."

The RAM 102 is a volatile semiconductor memory device that temporarily stores programs for execution by the CPU 101, as well as various data objects that the CPU 101 manipulates in the course of computation. The storage space of the RAM 102 is managed in small fixed-length segments called "pages." Other type of memory devices may be used in place of or together with the RAM 102, and the physical machine 100 may have two or more sets of such memory devices.

The transaction monitor 103 is a hardware module connected to, for example, a memory bus between the CPU 101 and RAM 102 to keep watch on the memory access from the CPU 101. The physical machine 100 may have two or more processors, and these processors may be configured to access the RAM 102 as their shared memory. In this case, the transaction monitor 103 watches multiple access from the processors.

As will be described later, the transaction monitor 103 monitors write operations to some pages in the RAM 102 when a certain condition is met. When a write operation to one of those pages is detected, the transaction monitor 103 places a modification history record in an update buffer prepared in the RAM 102, thereby recording what has been written to where. The transaction monitor 103 actually watches a translation lookaside buffer (TLB) table to detect write operations. This TLB table is created by the CPU 101 for the purpose of translation between virtual memory address and physical memory address, and it is stored in, for example, a memory management unit integrated in the CPU 101. Alternatively, the TLB table may be stored in the transaction monitor 103 or some other place outside the CPU 101. As another example, a TLB table may be constructed on the RAM 102 so that the CPU 101 may load a part of it.

The update buffer management unit 104 is a hardware module designed for keeping watch on update buffers in the RAM 102. As will be described later, the update buffer management unit 104 may rewrite the TLB table when the amount of modification history records accumulated in an update buffer exceeds a first threshold. The update buffer management unit 104 may also issue an interrupt signal to the CPU 101 when the amount of modification history records accumulated in an update buffer exceeds a first threshold.

The transaction monitor 103 and the update buffer management unit 104 described above may be implemented together in a single hardware module. The update buffers may be implemented, not in the RAM 102, but in a dedicated buffer memory (not illustrated) in the physical machine 100. In that case, the update buffer management unit 104 may be integrated together with the dedicated buffer memory.

The HDD 105 serves as a non-volatile storage device to store program and data files of the OS, middleware, applications, and other kinds of software. Programs files include those for migration of virtual machines between physical machines. The physical machine 100 may include other types of non-volatile storage devices, such as flash memories and solid state drives (SSD), in place of or together with the HDD 105.

The video signal processing unit 106 produces images in accordance with commands from the CPU 101 and outputs them on a screen of a monitor 111 coupled to the physical machine 100. The monitor 111 may be, for example, a cathode ray tube (CRT) display, liquid crystal display (LCD), plasma display panel (PDP), organic electro-luminescence (OEL) display, or other display device.

The input signal processing unit 107 receives input signals from input devices 112 coupled to the physical machine 100 and supplies them to the CPU 101. The input devices 112 include pointing devices (e.g., mouse, touchscreen, touchpad, and trackball), keyboards, remote controllers, push button switches, and the like. The physical machine 100 allows connection of two or more input devices of different categories.

The media reader 108 is a device for reading programs and data stored in storage media 113. Storage media 113 include, for example, magnetic disks, optical discs, magneto-optical discs (MO), and semiconductor memory devices. Magnetic disks include flexible disks (FD) and HDDs. Optical discs include compact discs (CD) and digital versatile discs (DVD).

The media reader 108 transfers program files and data files read out of such a storage medium 113 to another storage medium (e.g., RAM 102 or HDD 105). The programs are executed by, for example, the CPU 101. The storage media 113 may be portable storage media used for distribution of programs and data. These storage media 113 and HDD 105 alike may be referred to as computer-readable media.

The communication interface 109 is connected to a network 30, allowing the CPU 101 to communicate with other computers (not illustrated) via a network 30. More particularly, the illustrated communication interface 109 in FIG. 3 is a wired network interface cabled to a network device (e.g., switches). The communication interface 109 may be a wireless network interface connected to a base station via a radio link (not illustrated).

Figure 4:
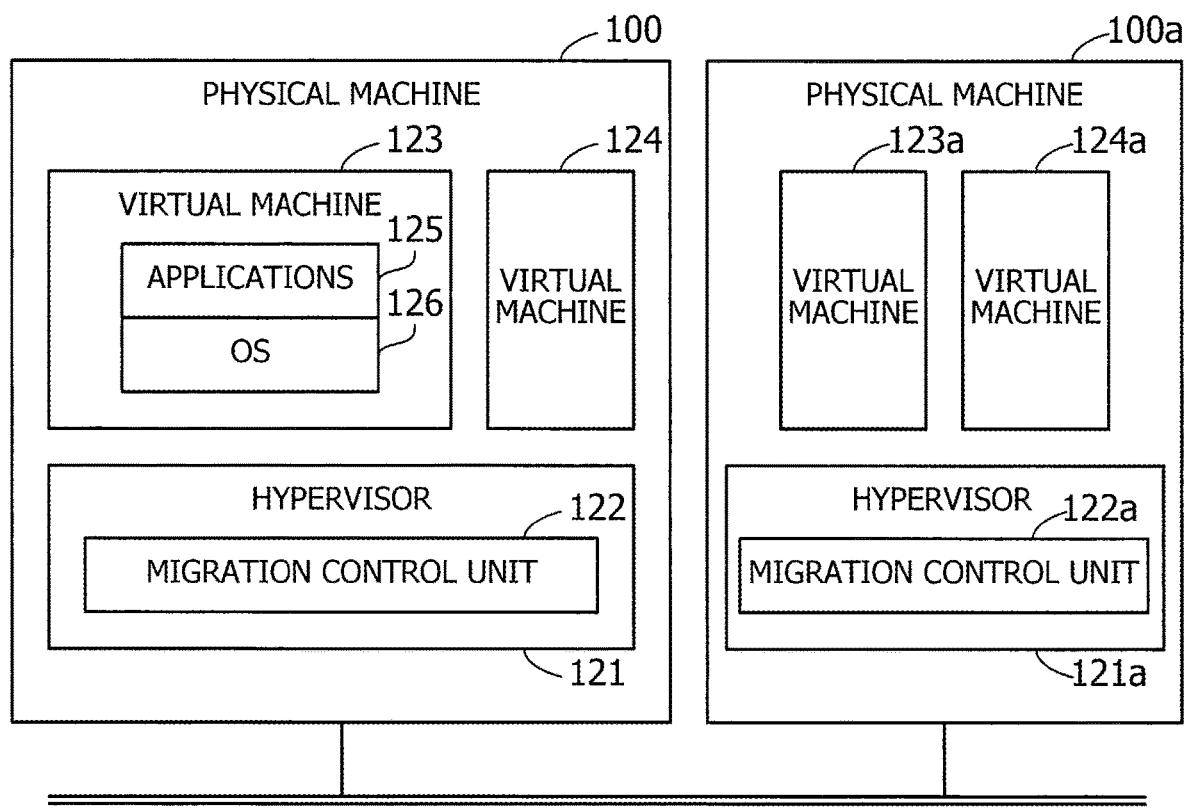
FIG. 4 is a block diagram illustrating arrangement of virtual machines by way of example.

FIG. 4 is a block diagram illustrating arrangement of virtual machines by way of example. Specifically, FIG. 4 illustrates two physical machines, referred to herein as first and second physical machines 100 and 100a. The first physical machine 100 includes a hypervisor 121 and two virtual machines 123 and 124. The hypervisor 121 allocates hardware resources of the first physical machine 100 (e.g., processing time of the CPU 101 and memory space of the RAM 102) to the virtual machines 123 and 124. One virtual machine 123 executes applications 125 and OS 126. The applications 125 are processes invoked by application programs. The OS 126 manages hardware resources allocated by the hypervisor 121 and uses them to execute the applications 125. The other virtual machine 124 also executes applications using hardware resources allocated by the hypervisor 121.

The second physical machine 100a similarly includes a hypervisor 121a and virtual machines 123a and 124a. The hypervisor 121a allocates hardware resources of the second physical machine 100a to virtual machines 123a and 124a. The virtual machines 123a and 124a execute applications using their hardware resources allocated by the hypervisor 121a.

The two physical machines 100 and 100a may migrate their virtual machine to each other. For example, a virtual machine 123 may be migrated from the first physical machine 100 to the second physical machine 100a. To this end, the hypervisor 121 in the first physical machine 100 has a migration control unit 122, and the hypervisor 121a in the second physical machine 100a has a migration control unit 122a. These migration control units 122 and 122a control the process of moving virtual machines. Specifically, live migration functions are implemented in the migration control units 122 and 122a so as to move a virtual machine without the need for shutting down its OS or applications.

The next section of the description will explain how a virtual machine is migrated between physical machines. Specifically, the explanation assumes migration of a virtual machine 123 from the first physical machine 100 (source) to the second physical machine 100a (destination).

Figure 5:
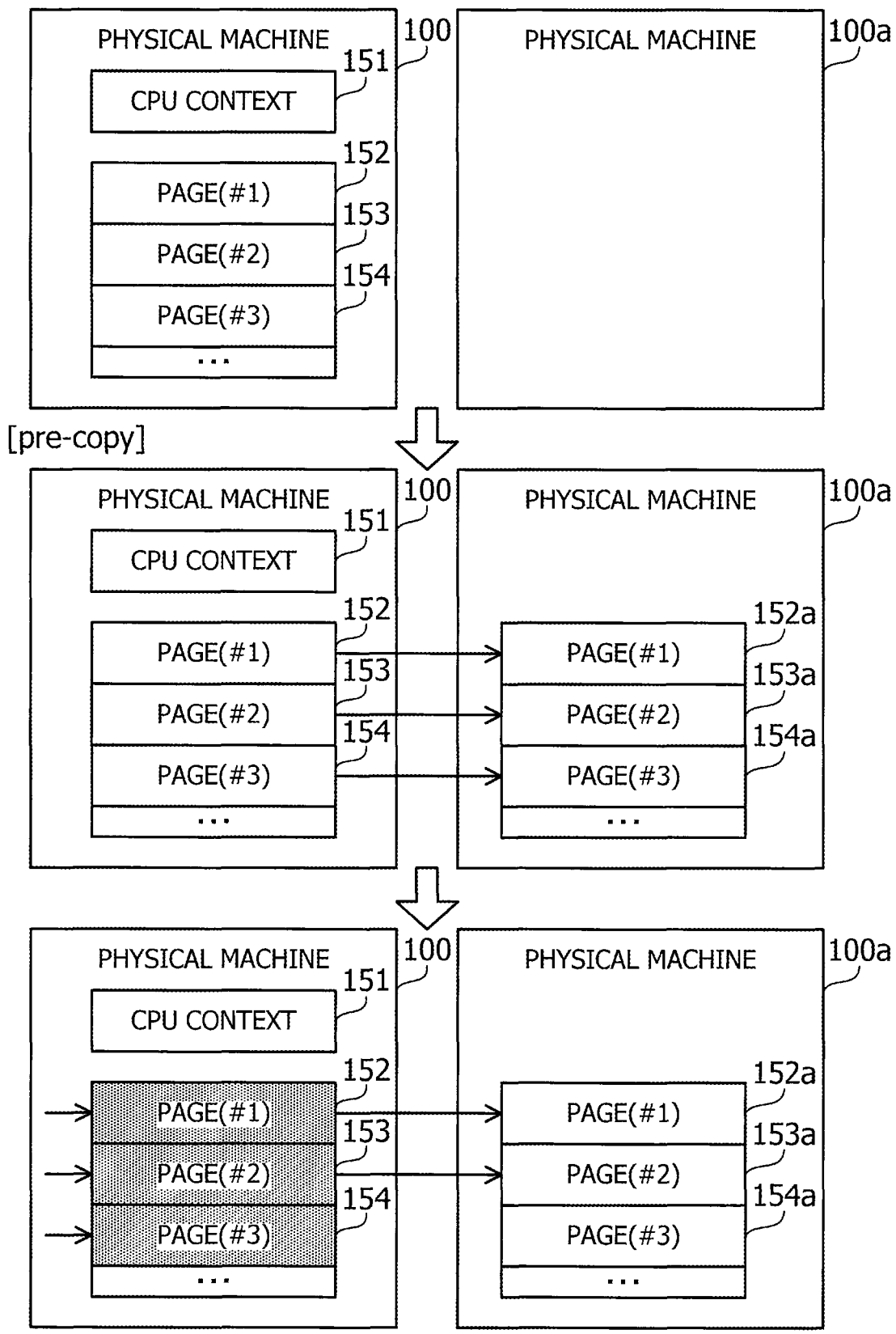
FIGS. 5 and 6 illustrate a first example of a pre-copy migration method.
Figure 6:
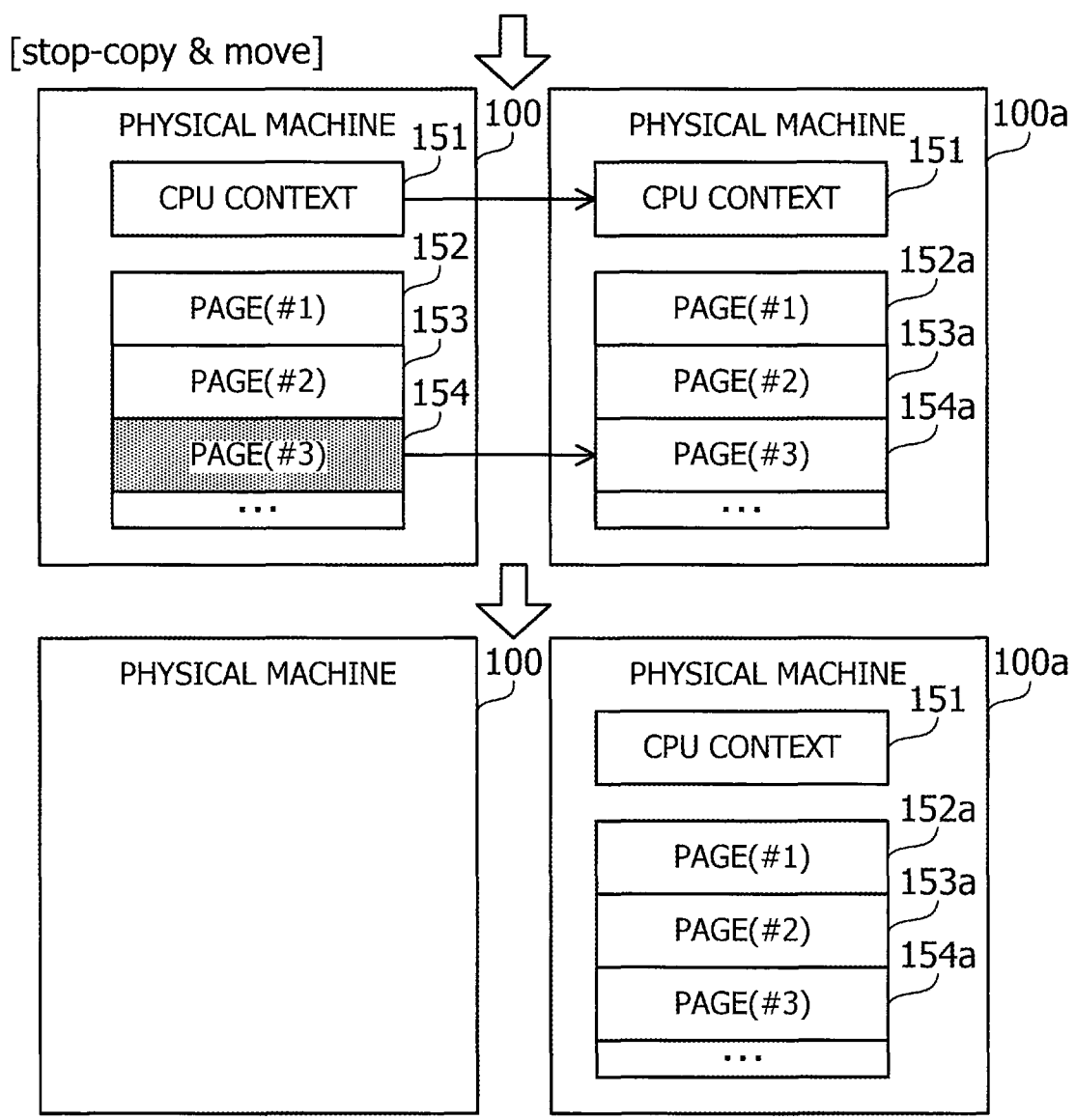

FIGS. 5 and 6 illustrate a first example of a pre-copy migration method. This pre-copy live migration method is formed from two phases, called "pre-copy" and "stop-copy & move." In pre-copy phase, the current memory page data of the virtual machine under migration is copied from the source physical machine to the destination physical machine without closing the virtual machine. This pre-copy phase makes a single copy of all pages allocated to the virtual machine. Since the virtual machine stays active, it is possible that one or more of the memory pages become dirty during the pre-copying. To deal with such dirty pages, additional copy operations may take place to deliver at least some of them to the destination physical machine. The live migration process proceeds to stop-copy & move phase when the number of dirty pages falls below a second threshold.

In stop-copy & move phase, the source physical machine stops the virtual machine of interest and then copies data in the remaining dirty pages to the destination physical machine, together with the current state (CPU context) of the virtual machine. The CPU context includes register values (e.g., program counter) in the CPU 101 itself, as well as those temporarily saved in the RAM 102. The destination physical machine then resumes the stopped operation of the virtual machine using the copied page data and CPU context.

The following description will discuss two methods for copying page data. The first method copies page data page by page as will be described below. That is, the first method identifies dirty pages by detecting write operations executed on their page data and make another copy of entire data in each dirty page. Suppose, for example, that the source physical machine 100 has allocated multiple pages to a virtual machine 123, including pages (#1) 152 to (#3) 154, as depicted in the topmost part of FIG. 5. The source physical machine 100 also has a CPU context 151 of the virtual machine 123. Upon start of a live migration process, the destination physical machine 100a prepares multiple pages, including pages (#1) 152a to (#3) 154a, for use by the virtual machine 123 after migration. These pages 152a, 153a, and 154a are counterparts of the pages 152, 153, and 154 in the source physical machine 100. The source physical machine 100 transmits data stored in all source pages 152, 153 and 154 to their corresponding destination pages 152a, 153a, and 154a, as seen in the middle part of FIG. 5.

Suppose now that the virtual machine 123 modifies data in two pages (#1) 152 and (#2) 153 before the source physical machine 100 completes transmission of all page data. These modifications cause the source physical machine 100 to recognize the pages 152 and 153 as dirty pages. When the number of dirty pages exceeds a second threshold, the source physical machine 100 transmits entire data of dirty pages 152 and 153 to the destination physical machine 100a as seen in the bottom most part of FIG. 5. Consequently the page (#1) 152a is overwritten with new data of its corresponding page (#1) 152, and the page (#2) 153a is overwritten with new data of its corresponding page (#2) 153.

Suppose that the virtual machine 123 modifies data in page (#3) 154, thus making it yet another dirty page. The data transfer for dirty pages is repeated as long as the number of dirty pages exceeds the second threshold.

FIG. 6 is a continued part of the first example of a pre-copy migration method. When the number of dirty pages falls below the second threshold, the source physical machine 100 forcibly stops the virtual machine 123 by deallocating its CPU processing time. The source physical machine 100 then transmits entire data in the remaining dirty page (#3) 154 to the destination physical machine 100a, so that the destination page (#3) 154a is overwritten with new data in its corresponding source page (#3) 154, as seen in the upper half of FIG. 6. The source physical machine 100 also sends the CPU context 151 at the time when the virtual machine 123 is stopped. The destination physical machine 100a saves the received CPU context 151 at an appropriate place in the RAM to allow the CPU to load it when the migrated virtual machine 123 resumes its operation in the destination physical machine 100a.

The source physical machine 100 releases hardware resources from the virtual machine 123, thereby freeing the pages 152 to 154 and deleting their page data. The destination physical machine 100a, on the other hand, causes the virtual machine 123 to resume its processing operation using the copied CPU context 151 and copied data in pages 152a to 154a, as seen in the lower half of FIG. 6. The virtual machine 123 now restarts from the point at which it was stopped by the source physical machine 100.

The above-described first method of live migration, however, may lose efficiency in the case where the virtual machine 123 frequently writes data in its RAM 102. Particularly, the efficiency is spoiled when the virtual machine 123 writes many distributed pages, whether the write size is small or not. Such frequent distributed write operations bring about frequent occurrence of dirty pages in pre-copy phase, thus making it difficult to reduce the number of dirty pages. That is, the live migration process is unable to proceed to stop-copy & move phase because the pre-copying of dirty pages does not end until their number falls below the second threshold. If this situation continues until a specified time is exhausted, the live migration process would fail with a timeout error.

One possible solution for the first method's problem may be to configure the source physical machine 100 to forcibly move from pre-copy phase to stop-copy & move phase when it sees expiration of a predetermined time limit during the pre-copy phase. In this case, however, the source physical machine 100 stays in stop-copy & move phase for a longer time because it already has a large amount of dirty page data to transmit. Accordingly, the noted solution could end up with a long substantial down-time of the virtual machine 123. It might be an option to forcibly reduce the page dirtying rate (i.e., the occurrence rate of dirty pages) by cutting the allocation of CPU processing time to the virtual machine 123. This option would, however, spoil the performance of the virtual machine 123 during its migration period.

As another possible solution, a post-copy method may be used instead of pre-copy. The post-copy migration method first copies CPU context 151 alone to the destination physical machine 100a and causes the virtual machine 123 to run on the destination physical machine 100a. Since there is no page data in the destination physical machine 100a, an access attempt from the virtual machine 123 to uncopied pages results in a page fault, which triggers loading of pertaining page data from the source physical machine 100.

The post-copy migration method may, however, spoil the performance of the virtual machine 123 during a period immediately after the migration is done.

In view of the above, the two physical machines 100 and 100a of the second embodiment are designed to execute a pre-copy live migration by using a second method described below.

Figure 7:
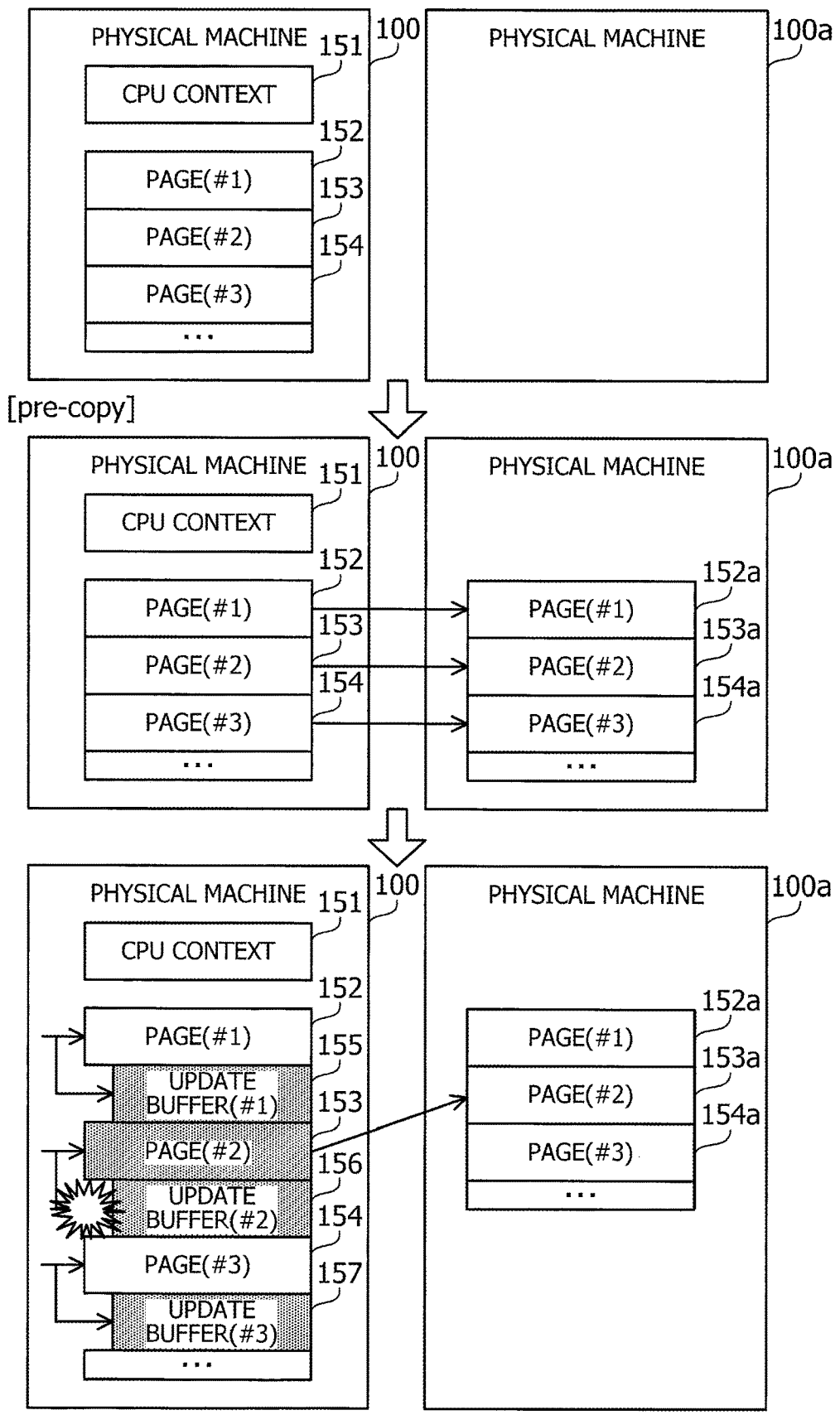
FIGS. 7 and 8 illustrate a second example of a pre-copy migration method.
Figure 8:
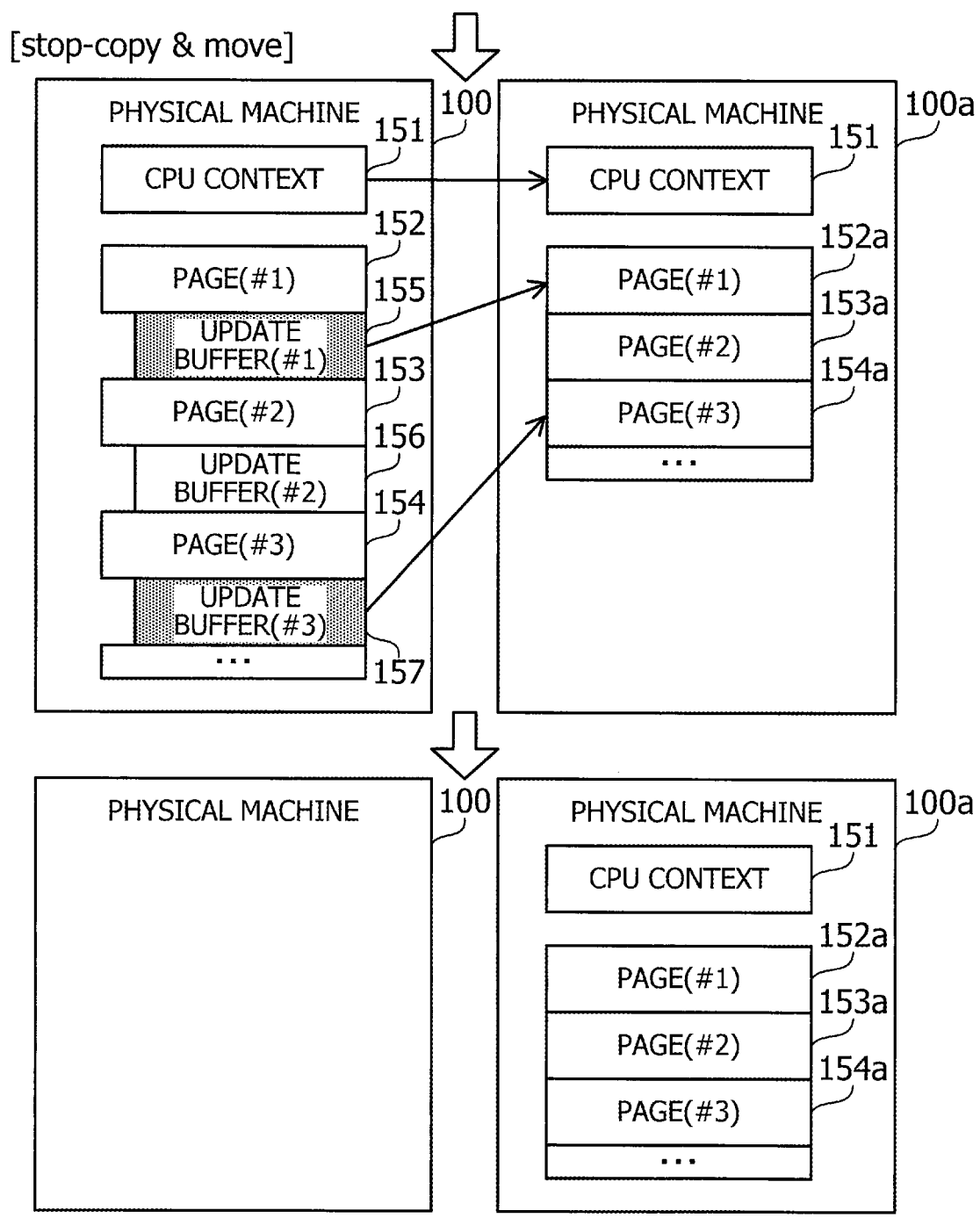

FIGS. 7 and 8 illustrate a second example of a pre-copy migration method. According to the second method mentioned above, the source physical machine 100 reserves update buffers in its RAM 102. These update buffers respectively correspond to different pages allocated to one virtual machine 123. When the virtual machine 123 modifies data in a page, the source physical machine 100 generates a difference record that describes the modification and enters the difference record to an update buffer corresponding to the modified page.

The source physical machine 100 treats less-modified pages as if they were clean pages (non-dirty pages). In other words, a page is considered to be "clean" when its corresponding update buffer contains only a small number of difference records. The source physical machine 100 has no need to resend entire data of pages to the destination physical machine 100a, as long as these pages are regarded as clean pages. In other words, the source physical machine 100 executes the resending of such pages only when the accumulation of difference records reaches a certain critical level in the corresponding update buffers. Those pages are considered to become dirty at that time. In stop-copy & move phase, the source physical machine 100 sends difference records of the remaining modified pages (i.e., what was regarded as clean pages) to the destination physical machine 100a, instead of transmitting entire page data.

Referring to the example of FIG. 7, the source physical machine 100 has allocated multiple pages to a virtual machine 123, including pages (#1) 152 to (#3) 154, as seen in the topmost part of FIG. 7. The source physical machine 100 also has a CPU context 151 of the virtual machine 123. Similarly to the foregoing first method, the source physical machine 100 transmits all page data of the virtual machine 123 to the destination physical machine 100a, as seen in the middle part of FIG. 7. Specifically, the data stored in source pages (#1) 152, (#2) 153 and (#3) 154 are written into their corresponding destination pages (#1) 152a, (#2) 153a, and (#3) 154a.

The source physical machine 100 prepares update buffers 155, 156, and 157 for pages (#1) 152, (#2) 153, and (#3) 154, respectively, as depicted in the bottommost portion of FIG. 7. The virtual machine 123 under migration may modify data stored in pages 152 to 154 before the source physical machine 100 completes initial transmission of page data. The source physical machine 100 generates and enters difference records to the update buffers 155 to 157 to register each such modification. More specifically, the update buffer (#1) 155 stores difference records that describe write operations made to page (#1) 152. The update buffer (#2) 156 stores difference records that describe write operations made to page (#2) 153. The update buffer (#3) 157 stores difference records that describe write operations made to page (#3) 154. A single modification to these pages 152 to 154 would not mark the modified page dirty, allowing the source physical machine 100 to hold the modified page without sending its data to the destination physical machine 100a.

Suppose now that the amount of difference records in one update buffer (#2) 156 exceeds a first threshold because of many modifications made to page (#2) 153. This fact causes the source physical machine 100 to recognize the page (#2) 153 as a dirty page. When the number of such dirty pages exceeds a second threshold, the source physical machine 100 retransmits entire data stored in the page (#2) 153 to the destination physical machine 100a, while removing difference records from the update buffer (#2) 156. This retransmission of dirty pages is repeated as long as the number of dirty pages exceeds the second threshold.

FIG. 8 is a continued part of the second example of a pre-copy migration method. When the number of dirty pages falls to or below the second threshold, the source physical machine 100 forcibly stops the virtual machine 123 under migration. If the amount of difference records exceeds the first threshold in any of the remaining dirty pages, the source physical machine 100 transmits entire data of such dirty pages to the destination physical machine 100a. Regarding the other remaining dirty pages, the source physical machine 100 transmits difference records stored in their corresponding update buffers to the destination physical machine 100a. In the example of FIG. 8, two update buffers (#1) 155 and (#3) 157 contain such unsent difference records. Accordingly, the source physical machine 100 reads out those difference records and transmits them to the destination physical machine 100a, as seen in the upper half of FIG. 8.

The destination physical machine 100a updates its local page data with difference records received from the source physical machine 100. More specifically, the existing data in pages (#1) 152a and (#3) 154a is updated with difference records stored in update buffers (#1) 155 and (#3) 157, respectively. The source physical machine 100 also sends the CPU context 151 to the destination physical machine 100a. The source physical machine 100 then deallocates hardware resources from the virtual machine 123 in the same way as discussed in the foregoing first method. The destination physical machine 100a causes the virtual machine 123 to resume its information processing operation using the copied CPU context 151 and copied data in pages 152a to 154a, as seen in the lower half of FIG. 8.

The second method described above eliminates the need for retransmitting entire data of modified pages in the case where the modification is limited in a part of the pages, thus reducing the amount of data that the source physical machine 100 has to transmit to the destination physical machine 100a. The second method also regards less-modified pages as clean pages, thus permitting the migration process to proceed smoothly from pre-copy phase to stop-copy & move phase. Consequently the second method expedites the live migration.

Figure 9:
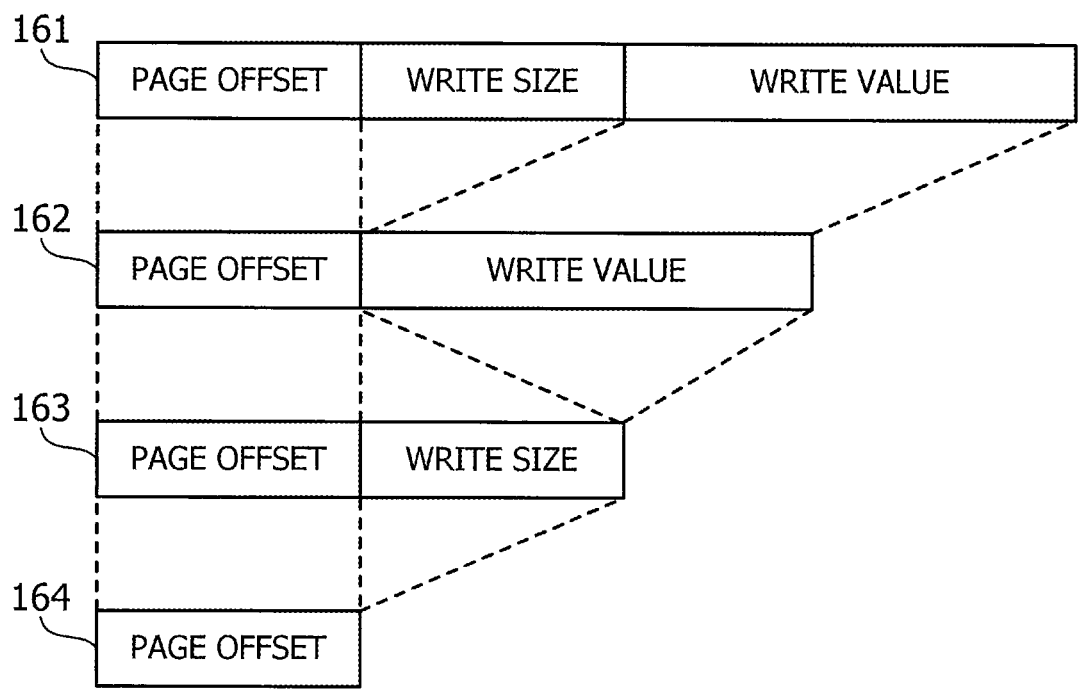
FIG. 9 illustrates several examples of modification history formats.

FIG. 9 illustrates several examples of modification history formats. The illustrated formats 161 to 164 in FIG. 9 are among those used to store difference records in update buffers 155 to 157. Referring to the first (topmost) format 161 in FIG. 9, each write operation is represented in a difference record formed from three data fields, including page offset, write size, and write value. The page offset field contains a relative address that indicates a distance from the top of the page to the top write address. The write size field indicates the write value's length measured in bytes, and the write value field contains a bit string that was actually written.

Referring to the second format 162 in FIG. 9, the illustrated difference record has no write size field, but is formed only from page offset and write value fields. The lack of write size means that the write value has a certain fixed byte length, such as cache line size (e.g., 64 bytes) of cache memory. When the actual write data is shorter than the fixed byte length, the remaining space of the write value field is filled with an unmodified bit string that follows the modified data. When the actual write data exceeds the fixed byte length, the write operation is recorded in two or more difference records in a divided manner. The source physical machine 100 may insert a write size field to difference records to explicitly indicate the size of write data when transmitting them to the destination physical machine 100a.

Referring to the third format 163 in FIG. 9, the illustrated difference record has no write value field, but is formed only from page offset and write size fields. When this format is used, the source physical machine 100 makes up for the missing write value at the time of transmitting the difference record. That is, a bit string is read out of the page according to the page offset field and write size field in the difference record. This bit string is inserted to the difference record as its write value field before the record is transmitted.

Referring to the fourth format 164 in FIG. 9, the illustrated difference record includes a page offset field alone, while omitting write size and write value fields. The omitted write size field is treated in the same way as in the second format 162 described above. The omitted write value field is recovered in the same way as in the third format 163 described above. That is, when transmitting a difference record, the source physical machine 100 reads out a pertaining bit string from its corresponding page, according to a predetermined byte length and the specified page offset, and adds a write value field to the difference record to deliver the bit string. The source physical machine 100 may optionally insert a write size field to the difference record to explicitly indicate the size of written data.

As described previously, it is the transaction monitor 103 that produces and stores difference records in update buffers on the RAM 102. When the amount of these difference records exceeds a first threshold, it is the update buffer management unit 104 that detects that fact. The second embodiment expands the functions of TLB table, which is primarily for associating virtual memory address with physical memory address, to control the transaction monitor 103 and update buffer management unit 104.

FIG. 10 illustrates an example of a TLB table. The illustrated TLB table 144 is formed from the following data fields: physical page number, write-inhibited flag, monitor flag, buffer-full flag, buffer address, buffer mode, and buffer size. When a virtual memory address is known, this TLB table 144 permits access to information about its corresponding virtual page, using a virtual page number contained in the virtual memory address.

The physical page number field of each table entry contains a physical page number that serves as an identifier of a page and constitutes a part of physical memory address. The write-inhibited flag field contains a flag used for controlling exclusivity in writing the page. Specifically, when it is "0" (OFF), the write-inhibited flag indicates that the page allows writing. When it is "1" (ON), the write-inhibited flag indicates that the page allows no writing (i.e., write-inhibited) because it is occupied by an existing writing process. The write-inhibited flag thus forces other writing processes, if any, to wait until it becomes OFF.

The monitor flag field contains a flag that indicates whether to generate a difference record when a write operation takes place in the page of interest. When it is "0" (OFF), the monitor flag indicates that there is no need for difference records. When it is "1" (ON), the monitor flag indicates that difference records are to be generated. Monitor flags are subject to rewriting by the migration control units 122 and 122a (FIG. 4).

The buffer-full flag field contains a flag that indicates whether the amount of difference records in the corresponding update buffer exceeds the first threshold. When it is "0" (OFF), the buffer-full flag indicates that the amount of difference records does not exceed the first threshold. When it is "1" (ON), the buffer-full flag indicates that the amount of difference record exceeds the first threshold. Buffer-full flags are subject to rewriting by the update buffer management unit 104 (FIG. 3) and migration control units 122 and 122a.

The buffer address field contains a physical memory address that indicates the top of a memory area reserved as an update buffer. The buffer mode field indicates the data format used in the corresponding update buffer to store difference records. For example, this format may be selected from among the foregoing four formats 161 to 164 (FIG. 9). The buffer size field indicates the size of the corresponding update buffer. The second embodiment assumes a fixed buffer mode and a fixed buffer size. Accordingly, the TLB table 144 may omit the buffer mode field and buffer size field.

Figure 11:
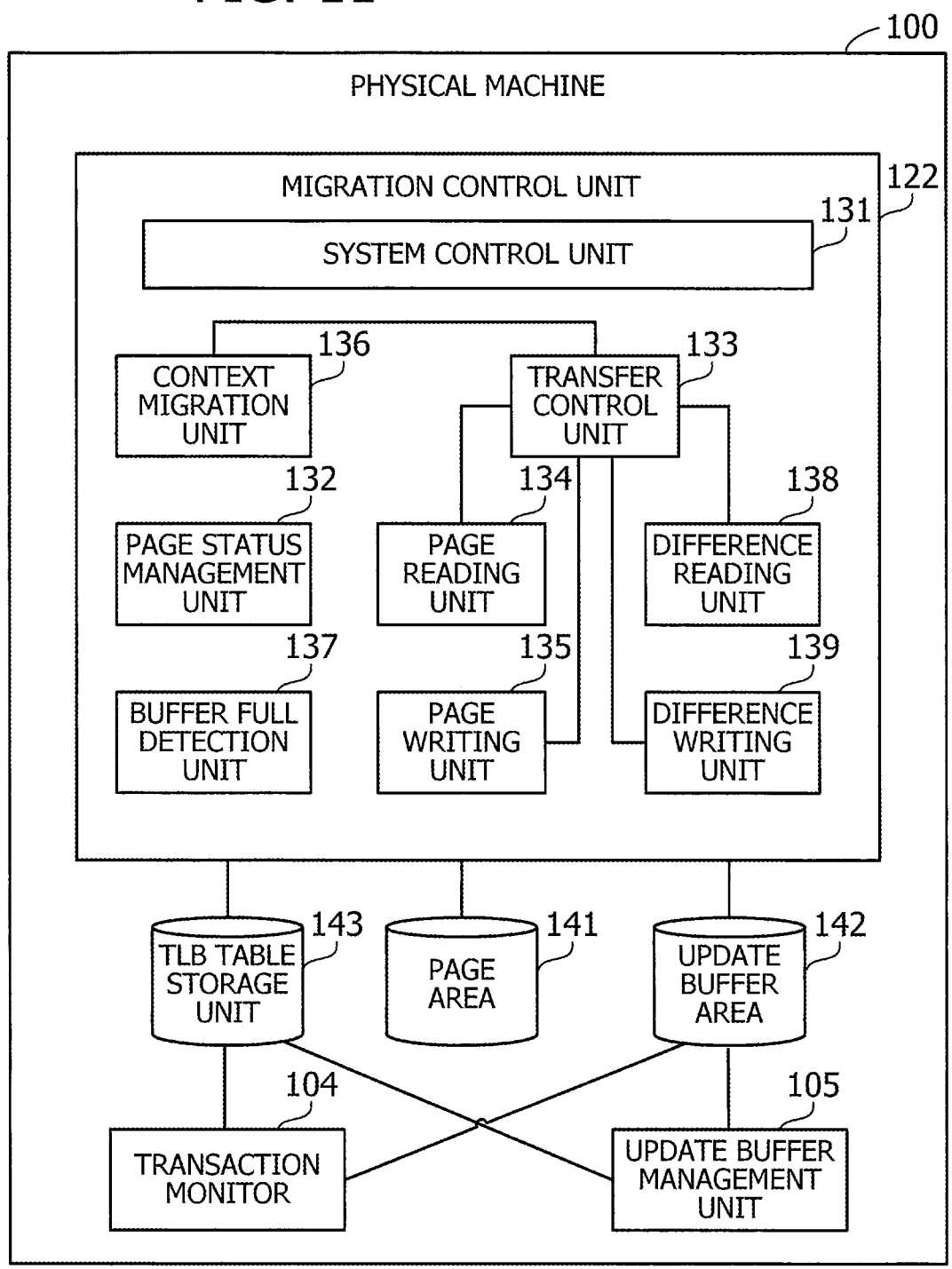
FIG. 11 is a block diagram illustrating an example of functions implemented in a physical machine.

The next part of the description will explain what functions are implemented in the physical machine 100. FIG. 11 is a block diagram illustrating an example of functions implemented in a physical machine. The illustrated physical machine 100 includes, among others, a migration control unit 122. The migration control unit 122 is formed from a system control unit 131, a page status management unit 132, a transfer control unit 133, a page reading unit 134, a page writing unit 135, a context migration unit 136, a buffer full detection unit 137, a difference reading unit 138, and a difference writing unit 139. For example, the migration control unit 122 is implemented as program modules that the CPU 101 executes. The physical machine 100 also includes a page area 141, an update buffer area 142, and a TLB table storage unit 143. The page area 141 and update buffer area 142 are reserved as part of the RAM 102. The TLB table storage unit 143 may also be reserved in the RAM 102 or may be a cache memory integrated in or provided outside the CPU 101.

The system control unit 131 controls the overall process of live migration by sending commands to other functional units in the migration control unit 122. The page status management unit 132 manages each page allocated to virtual machines. For example, a page may be in a "pre-transfer" state (i.e., not yet subjected to data transfer operations since the start of live migration) or in a "in-transfer" state (i.e., currently transferred). Other possible page states include a "clean-after-transfer" state (i.e., the page underwent one or more data transfer operations, and is still a clean page) or in a "dirty-after-transfer" state (i.e., the page underwent one or more data transfer operations, but has become dirty again). The page status management unit 132 changes the above-described flags in the TLB table 144 as needed.

The transfer control unit 133 controls communication of the physical machine 100 with other physical machines. Specifically, the transfer control unit 133 transmits page data to a destination physical machine upon its receipt from the page reading unit 134. The transfer control unit 133 also passes page data to the page writing unit 135 upon its receipt from a source physical machine. The transfer control unit 133 further transmits difference records to a destination physical machine upon their receipt from the difference reading unit 138. The transfer control unit 133 passes difference records to the difference writing unit 139 upon their receipt from a source physical machine.

Further, the transfer control unit 133 transmits CPU context to a destination physical machine upon its receipt from the context migration unit 136. The transfer control unit 133 also passes CPU context to the context migration unit 136 upon its receipt from a source physical machine.

The page reading unit 134 reads out entire data of a page from the RAM 102, when that page is specified by the system control unit 131, and passes it to the transfer control unit 133. The page writing unit 135, on the other hand, writes page data into the RAM 102 upon its receipt from the transfer control unit 133.

The context migration unit 136 controls migration of CPU context. Specifically, the context migration unit 136 collects CPU context related to a virtual machine according to commands from the system control unit 131. The context migration unit 136 passes the collected CPU context to the transfer control unit 133. More specifically, the system control unit 131 collects CPU context by, for example, causing the CPU 101 to save its register values in the RAM 102 and constructing CPU context data from the saved register values, together with other existing saved data in the RAM 102. The context migration unit 136 may also receive CPU context from the transfer control unit 133. In that case, the context migration unit 136 writes the received CPU context in an appropriate place in the RAM 102 so that it may be read into the CPU 101.

The buffer full detection unit 137 checks buffer-full flags in the TLB table 144 when so requested by the system control unit 131. When a buffer-full flag is ON, it means that the amount of difference records in its corresponding update buffer exceeds a first threshold. The buffer full detection unit 137 detects such pages with a buffer-full flag ON and notifies the system control unit 131 of them.

The difference reading unit 138 reads out difference records from an update buffer corresponding to a page specified by the system control unit 131 and passes the records to the transfer control unit 133. When some difference records have no write values, the difference reading unit 138 reads data out of the corresponding page and inserts it as write values to the pertaining difference records. When some difference records lack write sizes, the difference reading unit 138 inserts an implicit byte count to the pertaining difference records as their write size.

The difference writing unit 139 modifies a part of data in a page in accordance with difference records received from the transfer control unit 133. Specifically, the difference writing unit 139 determines which part of the page is specified by the page offset field and write size field of a difference record and overwrites the determined part with the write value contained in the difference record. When that difference record has no write size, the difference writing unit 139 uses a predetermined byte count in place of the unknown write size.

The page area 141 includes multiple pages allocated to virtual machines. The update buffer area 142 includes multiple update buffers respectively corresponding to different pages in the page area 141. These update buffers are constructed upon demand for use in live migration. The TLB table storage unit 143 is where the foregoing TLB table 144 resides. The transaction monitor 103 writes difference records into update buffers with reference to the TLB table 144, and the update buffer management unit 104 monitors these update buffers and updates the TLB table 144 accordingly.

While FIG. 11 illustrates one source physical machine 100 alone, the same functional blocks are provided in other physical machines as well. The next part of the description will explain the procedures of live migration.

Figure 12:
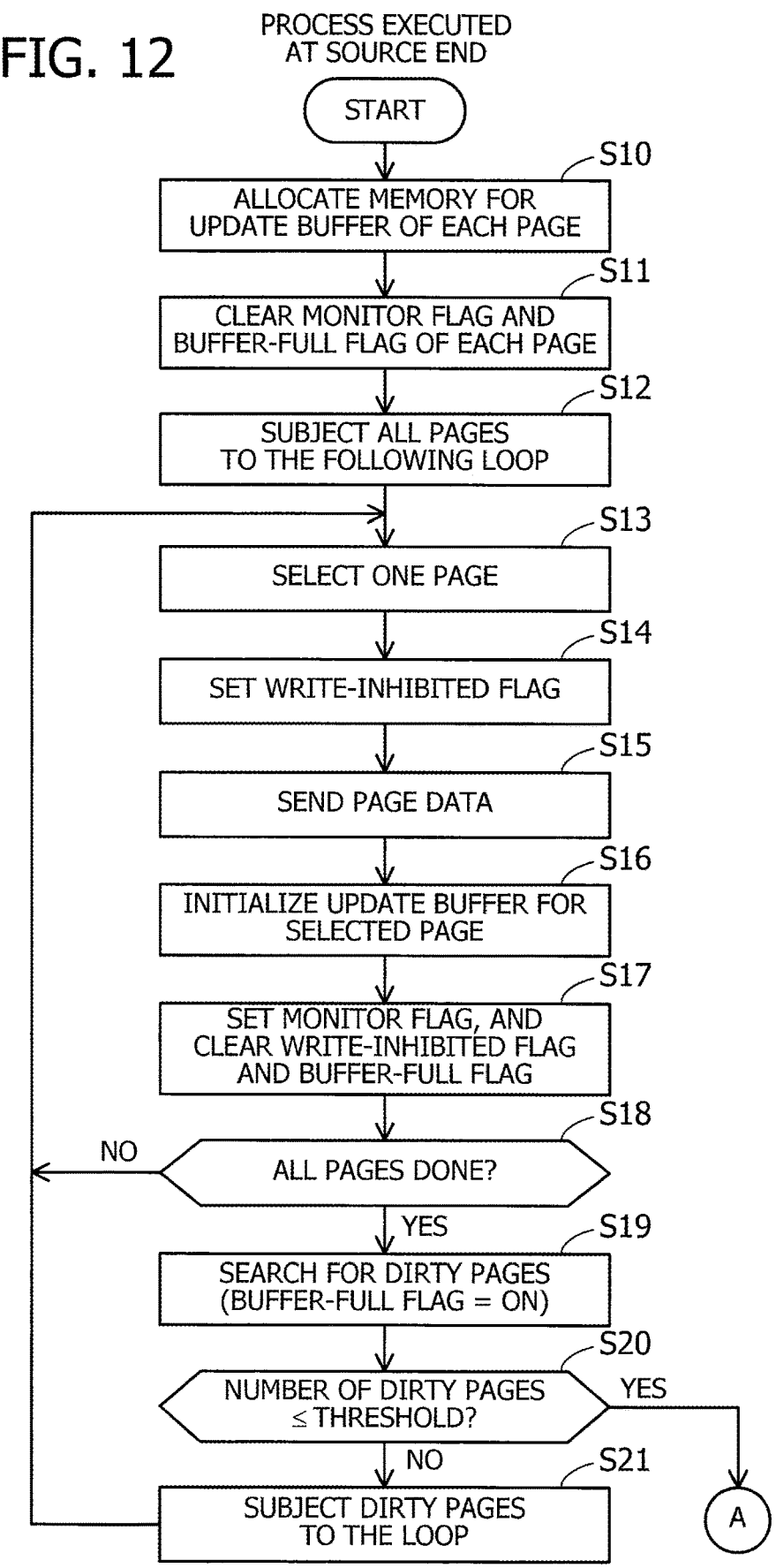
FIGS. 12 and 13 are a flowchart illustrating a procedure executed at the source end by way of example.

FIG. 12 is a flowchart illustrating a procedure executed at the source end by way of example. This flowchart assumes that the foregoing physical machine 100 is at the source end of live migration. Other physical machines may operate similarly to the physical machine 100.

(S10) The system control unit 131 identifies which pages are currently allocated to the virtual machine to be moved. The system control unit 131 then reserves update buffers in the RAM 102, one for each identified page, and writes their respective buffer addresses into the TLB table 144. The system control unit 131 may also write their buffer sizes and buffer modes unless these values are fixed.

(S11) With respect to all the pages identified in step S10, the page status management unit 132 sets a value of OFF to their monitor flags and buffer-full flags in the TLB table 144. The process now executes pre-copy phase in steps S12 to S22 below.

(S12) The system control unit 131 subjects all the pages identified in step S10 to the following loop.

(S13) The system control unit 131 selects one of the pages subjected in the above step S12 or in step S21 described below.

(S14) With respect to the page selected in step S13, the page status management unit 132 sets a value of ON to its write-inhibited flag in the TLB table 144.

(S15) The page reading unit 134 reads out entire data of the selected page from the page area 141. The transfer control unit 133 then transmits this page data to the destination physical machine 100a.

(S16) The system control unit 131 removes all difference records, if any, concerning the selected page, thus initializing the corresponding update buffer.

(S17) With respect to the selected page, the page status management unit 132 sets a value of ON to its monitor flag and a value of OFF to its write-inhibited flag and buffer-full flag in the TLB table 144.

(S18) The system control unit 131 determines whether step S13 has selected all the subjected pages. When all pages have been selected, the process advances to step S19. When there are unselected pages, the process returns to step S13.

(S19) The buffer full detection unit 137 searches the TLB table 144 for pages whose buffer-full flags are ON. The found pages are referred to as dirty pages.

(S20) The system control unit 131 determines whether the number of dirty pages found in step S19 does not exceed a threshold. The process advances to step S21 when the number of dirty page exceeds the threshold. Otherwise, the process proceeds to step S22 in FIG. 13.

(S21) The system control unit 131 subjects all the dirty pages of step S19 to the above loop of steps S13 to S18. The process thus returns to step S13.

Figure 13:
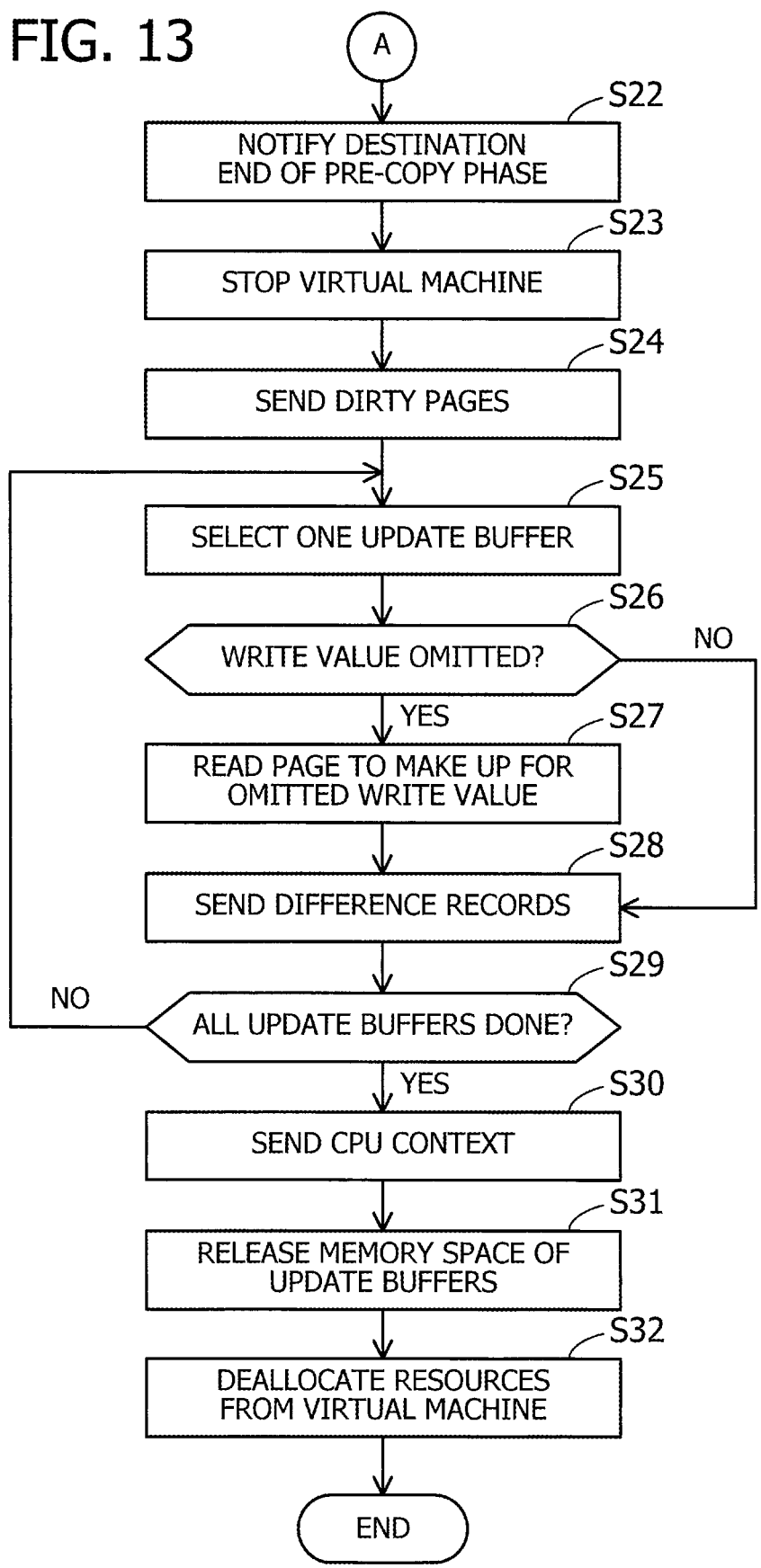

FIG. 13 is a continued part of the flowchart illustrating a procedure executed at the source end by way of example.

(S22) The system control unit 131 decides to advance the migration process from pre-copy phase to stop-copy & move phase. The transfer control unit 133 accordingly notifies the destination physical machine 100a of the end of pre-copy phase. The process now executes stop-copy & move phase in steps S23 to S30 below.

(S23) The context migration unit 136 stops the virtual machine under migration by, for example, changing its allocated CPU processing time to zero. This method forces the virtual machine to stop without disrupting its CPU context. Unlike the normal closing procedure, neither OS nor applications are shut down.

(S24) The buffer full detection unit 137 searches the TLB table 144 for pages whose buffer-full flags are ON. The found pages are considered dirty. The buffer full detection unit 137 may, however, omit this search and use the search result of step S19. The page reading unit 134 reads entire data of the found dirty pages from the page area 141, and the transfer control unit 133 transmits the data to the destination physical machine 100a.

(S25) The system control unit 131 selects one of the update buffers corresponding to clean pages of the virtual machine under migration.

(S26) The difference reading unit 138 checks the buffer mode of the update buffer selected in step S25. Specifically, the difference reading unit 138 determines whether the difference record format used in the selected update buffer has a write value field or not. For example, the difference reading unit 138 examines the buffer mode field of the TLB table 144 unless all update buffers are fixed to a known buffer mode. When the difference records omit their write values, the process advances to step S27. Otherwise, the process skips to step S28.

(S27) The difference reading unit 138 makes up for the omitted write value of each difference record in the selected update buffer. Specifically, the difference reading unit 138 locates a place specified by the page offset field and write size field of a difference record and reads out a bit string from that place in the corresponding page. This bit string is to be added to the difference record as its write value. The difference record may, however, lack its write size field as well. When this is the case, the difference reading unit 138 assumes that the write size is as large as a predetermined byte count (e.g., cache line size).

(S28) The transfer control unit 133 transmits all difference records in the selected update buffer to the destination physical machine 100a. The write value field of these difference records may have been added in step S27. The write size field of the same may also have been added in step S27.

(S29) The system control unit 131 determines whether step S25 has selected all the subjected update buffers. When all update buffers have been selected, the process advances to step S30. When there are unselected update buffers, the process goes back to step S25.

(S30) The context migration unit 136 collects CPU context, including program counter, of the virtual machine under migration. Some part of CPU context may reside in registers or cache memories of the CPU 101, or may have been saved in the RAM 102. The transfer control unit 133 transmits the collected CPU context to the destination physical machine 100a.

(S31) The system control unit 131 releases memory space of the update buffers allocated in step S10.

(S32) The system control unit 131 deallocates hardware resources (e.g., CPU 101 and RAM 102) from the virtual machine under migration. This step removes the virtual machine from the source physical machine 100, thus concluding the live migration process at the source end.

Figure 14:
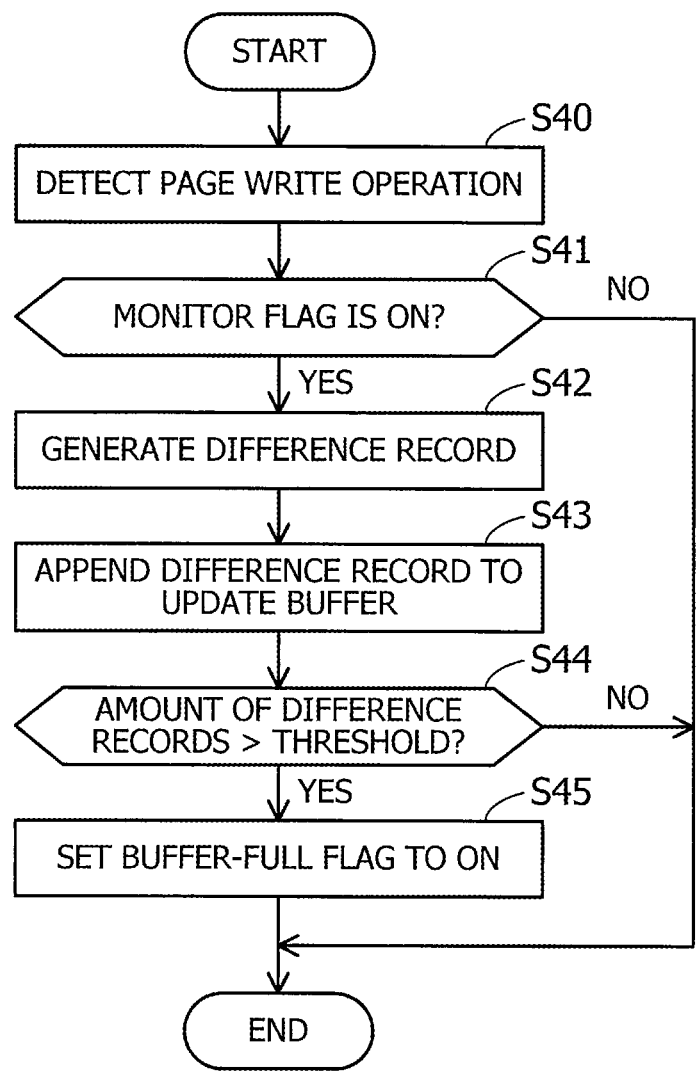
FIG. 14 is a flowchart illustrating a procedure of recording modification history by way of example.

FIG. 14 is a flowchart illustrating a procedure of recording modification history by way of example.

(S40) The transaction monitor 103 watches activities on the memory bus between the CPU 101 and RAM 102 and detects a write operation to a page.

(S41) The transaction monitor 103 looks into the TLB table 144 to examine the monitor flag of the written page detected in step S40. The transaction monitor 103 determines whether the monitor flag is ON. When the monitor flag is ON, the process advances to step S42. When the monitor flag is OFF, the present process of modification history generation is closed.

(S42) The transaction monitor 103 generates a difference record about the detected write operation of step S40. Specifically, the transaction monitor 103 determines a page offset from the details of the write operation and inserts it into the difference record. When the difference record format has a write size field, the transaction monitor 103 determines a write size from the details of the write operation and inserts it into the difference record. When the difference record format has a write value field, the transaction monitor 103 determines a write value from the details of the write operation and inserts it into the difference record. For the above control, the transaction monitor 103 may refer to the buffer mode field of the TLB table 144.

(S43) The transaction monitor 103 identifies which of the update buffers in the RAM 102 corresponds to the written page detected in step S40. To this end, the transaction monitor 103 may refer to the buffer address field and buffer size field of the TLB table 144. The transaction monitor 103 appends the difference record generated in step S42 to the tail end of the identified update buffer.

(S44) The update buffer management unit 104 determines whether the amount (e.g., total bytes) of difference records stored in the identified update buffer exceeds a threshold. The update buffer management unit 104 may refer to the buffer size field of the TLB table 144 in order to calculate the threshold. For example, the threshold may be set to a value slightly smaller than the buffer size. When the amount in question exceeds the threshold, the process advances to S45. Otherwise, this process of modification history generation is closed.

(S45) The update buffer management unit 104 updates the TLB table 144 by setting a value of ON to the buffer-full flag of the identified update buffer.

Figure 15:
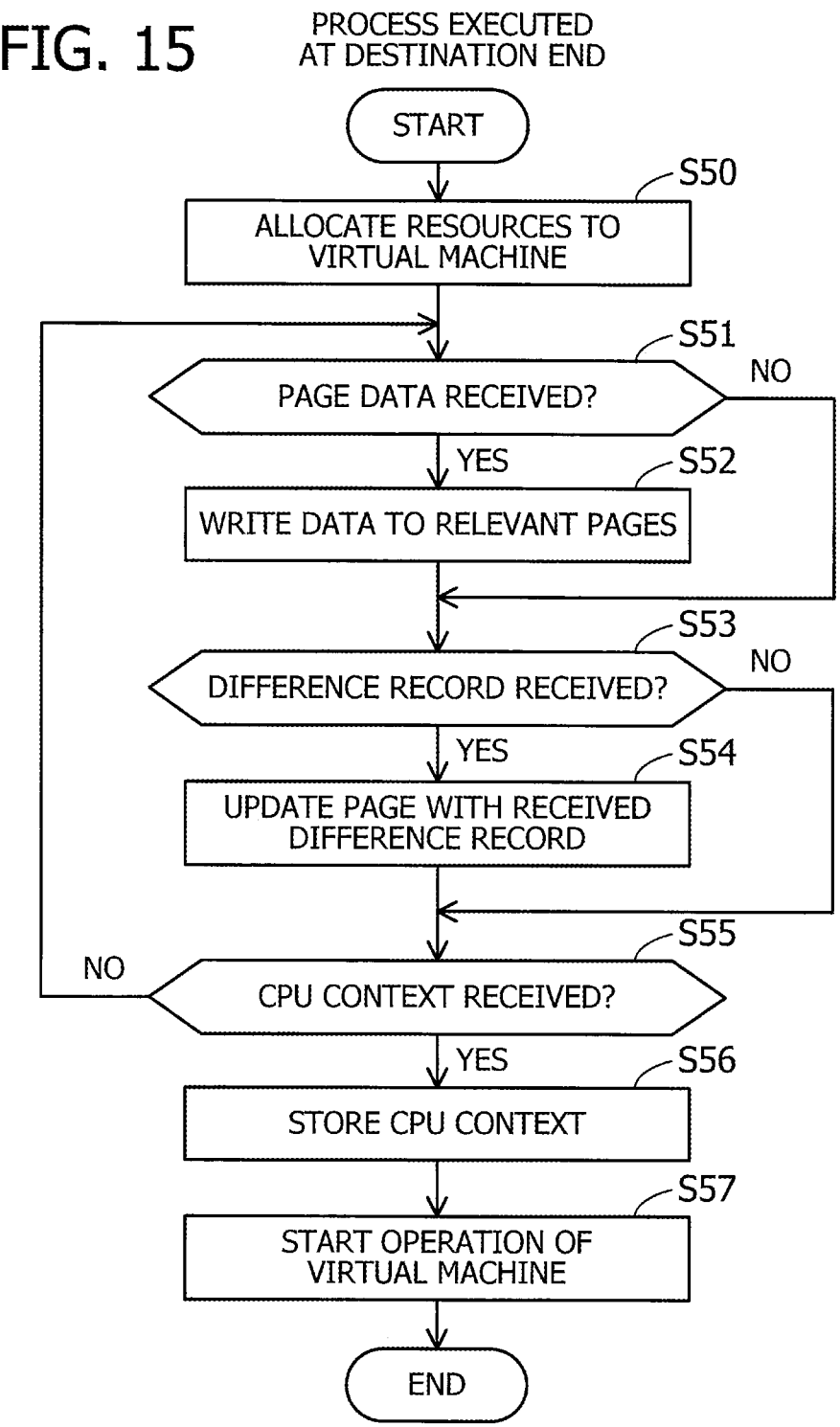
FIG. 15 is a flowchart illustrating a procedure executed at the destination end by way of example.

FIG. 15 is a flowchart illustrating a procedure executed at the destination end by way of example. This flowchart assumes that the foregoing physical machine 100 is at the destination end of live migration, while other physical machines may operate similarly to the physical machine 100.

(S50) The system control unit 131 allocates hardware resources (e.g., CPU 101 and RAM 102) to the virtual machine under migration.

(S51) The transfer control unit 133 determines whether the entire data of a page has been received. Reception of page data may take place in both pre-copy phase and stop-copy & move phase. Upon receipt of such page data, the process advances to step S52. Otherwise, the process skips to step S53.

(S52) The page writing unit 135 determines a destination page corresponding to the source page of the received page data. The destination page is supposed to be in the storage space allocated in step S50 from the RAM 102. The page writing unit 135 writes the received page data into the determined destination page. When the destination page has some existing data, the page writing unit 135 overwrites it with the received one.

(S53) The transfer control unit 133 determines whether a difference record (or difference records) for a page has been received. In the second embodiment, difference records may arrive in stop-copy & move phase. When a difference record is received, the process advances to step S54. Otherwise, the process skips to step S55. The flowchart of FIG. 15 may be modified such that step S53 is executed after the destination physical machine 100 is notified of the end of pre-copy phase, because the source physical machine in the second embodiment never transmits difference records in pre-copy phase.

(S54) The difference writing unit 139 performs the following things with respect to each of the difference records received in step S53. The difference writing unit 139 determines a destination page that corresponds to the source page to which the difference record is directed. The destination page is supposed to be in the storage space allocated in step S50 from the RAM 102 and has some existing data written in a previous write operation(s). The difference writing unit 139 updates the existing data with the received difference record. More specifically, the difference writing unit 139 first identifies which part of the page needs update, based on the page offset field and write size field of the difference record, and overwrites the identified part with a write value contained in the difference record. In the case where the difference record lacks its write size field, the difference writing unit 139 assumes that the write size is as large as a predetermined byte count (e.g., cache line size).

(S55) The transfer control unit 133 determines whether CPU context has been received. CPU context is supposed to be received at the end of stop-copy & move phase (i.e., after the page data and difference records). Upon receipt of CPU context, the process advances to step S56. Otherwise, the process goes back to step S51.

(S56) The context migration unit 136 stores the received CPU context in the RAM 102 so that the virtual machine may resume its information processing operations according to that CPU context. In other words, the context migration unit 136 permits the CPU 101 to load the program counter value and other register values from the CPU context in the RAM 102.

(S57) The system control unit 131 causes the virtual machine to start operation, thus permitting its programs to resume from the point indicated by the CPU context stored in step S56. In other words, the destination physical machine 100 takes over the context of information processing at the moment of the virtual machine's stoppage in the source physical machine 100a.

The second embodiment has been described above. The proposed information processing system generates a difference record and stores it in an update buffer each time a modification is made to page data during the process of pre-copy live migration. However, the second embodiment allows the pages to stay "clean" as long as their update buffers accumulate only a few difference records. A pages is considered "dirty" when the amount of its difference records exceeds a first threshold. After stopping the virtual machine under migration, the source physical machine transfers, not the entire data, but difference records, of dirty pages.

The above-described control apparently reduces the number of dirty pages, thus permitting the migration process to promptly move from pre-copy phase to stop-copy & move phase. This means a higher probability of successful completion of live migration. The second embodiment reduces the amount of transferred data in stop-copy & move phase, thus shortening the substantial down-time of the virtual machine. There is no need for reducing allocation of CPU processing time for virtual machines to decrease the page dirtying in pre-copy phase, and this allows the virtual machine to keep its performance even in the live migration process. The pre-copy method is advantageous over the post-copy method in that it alleviates performance degradation of a virtual machine after it is moved to a new location.

As can be seen from the above, the second embodiment facilitates smooth live migration. The second embodiment also allows omission of write sizes or write values or both of them in stored difference records, thus reducing the size of update buffers. The functions of storing difference records and detecting their amount are implemented in hardware circuitry using a TLB table 144. This hardware-based implementation alleviates performance degradation of access to the RAM 102 during its live migration.

(c) Third Embodiment

This part of the description explains a third embodiment. The third embodiment provides an information processing system that quickly detects a threshold-exceeding amount of difference records in an update buffer and transmits difference records, instead of whole page data, to the destination in pre-copy phase before the update buffer becomes truly full.

The information processing system of the third embodiment has the same system configuration discussed in FIG. 2. Physical machines in the third embodiment are implemented with the same hardware configuration discussed in FIG. 3 and the same software configuration discussed in FIG. 11. Also, physical machines in the third embodiment may use a TLB table similar to the one discussed in FIG. 10. The following part of the description will explain the third embodiment using the same reference numerals as in FIGS. 2, 3, 10, and 11.

According to the third embodiment, the update buffer management unit 104 asserts an interrupt signal to the CPU 101, besides setting a buffer-full flag to ON in the TLB table 144, when an update buffer sees a threshold-exceeding amount of difference records. This feature is implemented in the flowchart of modification history generation in FIG. 14 by modifying step S45 so as to include the act of issuing an interrupt to the CPU 101.

The foregoing flowchart of source-end process in FIGS. 12 and 13 is similarly applicable to the source physical machine in the third embodiment. Also, the foregoing flowchart of destination-end process in FIG. 15 is similarly applicable to the destination physical machine in the third embodiment. In the third embodiment, the source physical machine further performs advance transmission of difference records in parallel with the source-end process of FIGS. 12 and 13.

FIG. 16 is a flowchart illustrating a procedure of advance transmission of difference records by way of example.

(S60) The buffer full detection unit 137 detects an interrupt from the update buffer management unit 104. As mentioned above, this interrupt has been issued in step S45 of the flowchart in FIG. 14.

(S61) The buffer full detection unit 137 searches the TLB table 144 for a page whose buffer-full flag is ON. The found page is selected as a dirty page.

(S62) With respect to the dirty page selected in step S61, the page status management unit 132 sets its write-inhibited flag to ON in the TLB table 144.

(S63) The difference reading unit 138 checks the buffer mode of the pertaining update buffer (i.e., the one corresponding to the selected dirty page of step S61) and determines whether the buffer mode specifies omission of write values in difference records. When the buffer mode specifies such omission, the process advances to step S64. Otherwise, the process skips to step S65.

(S64) The difference reading unit 138 makes up for the omitted write values of difference records in the pertaining update buffer. Specifically, the difference reading unit 138 locates a place specified by the page offset field and write size field of a difference record and reads out a bit string from that place in the corresponding page. This bit string is to be added to the difference record as its write value. The difference record may, however, lack its write size field as well. When this is the case, the difference reading unit 138 assumes that the write size is as large as a predetermined byte count (e.g., cache line size).

(S65) The transfer control unit 133 transmits all difference records in the pertaining update buffer to the destination physical machine 100a. The write value field of these difference records may have been added in step S64.

(S66) The system control unit 131 initializes the pertaining update buffer by removing all obsolete (i.e., transmitted) difference records.

(S67) The page status management unit 132 updates the TLB table 144 by clearing the write-inhibited flag and buffer-full flag of the selected dirty page.

While the above procedure assumes that the update buffer management unit 104 issues an interrupt each time a dirty page arises, it is not intended to limit the third embodiment by that assumption. The update buffer management unit 104 may be configured to issue one interrupt for two or more dirty pages. In pre-copy phase of the third embodiment, the source physical machine performs parallel execution of the two processes described previously in FIGS. 12 and 16. In the case where dirty pages arise at a high rate, the loop of steps S13 to S21 would be repeated because new dirty pages may outnumber the dirty pages removed by the process of FIG. 16. The destination physical machine, on the other hand, executes steps S53 and S54 of FIG. 15 even in pre-copy phase, unlike in the second embodiment.

The third embodiment has been described above. The proposed information processing system provides the same advantages discussed previously for the second embodiment. In addition, the third embodiment makes it possible to promptly detect the fact that the amount of difference records in an update buffer has exceeded a threshold and to transfer these difference records before they become too many. This mechanism reduces the total amount of transferred data in pre-copy phase, compared to the case of copying entire data of dirty pages.

(d) Fourth Embodiment

This part of the description explains a fourth embodiment. The fourth embodiment proposes an information processing system that dynamically changes the buffer mode of each update buffer so as to adjust the balance between the number of difference records that an update buffer may accommodate and the load of transmitting difference records.

When difference records in an update buffer include write values, their transmission is performed with a relatively light processing load because there is no need for making access to the pertaining page to read write values. As the size of each difference record increases in this case, the effective capacity of the update buffer decreases accordingly. This means the possibility of more frequent occurrence of dirty pages. In contrast, when difference records are stored without write values, their transmission takes a relatively heavy processing load because the pertaining page has to be read before each difference record is transmitted. It is noted, however, that the smaller record size enables an update buffer to accommodate more difference records and thus reduces the page dirtying rate.

In view of the above, the fourth embodiment configures its page status management unit 132 as follows. Initially the page status management unit 132 sets a write-value-inclusive buffer mode (e.g., the first format 161 or second format 162 discussed in FIG. 9) to each update buffer. Some pages may be modified at a high rate during the course of live migration. The page status management unit 132 then changes the buffer mode for these pages to a write-value-omitting buffer mode (e.g., the third format 163 or fourth format 164 discussed in FIG. 9). This mode switching mechanism prevents frequently-modified pages from easily becoming dirty pages, while reducing the load for transmitting difference records in less-modified pages.

The information processing system of the fourth embodiment has the same system configuration discussed in FIG. 2. Physical machines in the fourth embodiment are implemented with the same hardware configuration discussed in FIG. 3 and the same software configuration discussed in FIG. 11. Physical machines in the fourth embodiment may use a TLB table similar to the one discussed in FIG. 10. The following part of the description will explain the fourth embodiment using the same reference numerals as in FIGS. 2, 3, 10, and 11.

The foregoing flowchart of source-end process in FIGS. 12 and 13 and the foregoing flowchart of recording modification history in FIG. 14 are similarly applicable to the source physical machine in the fourth embodiment. Also, the foregoing flowchart of destination-end process in FIG. 15 is similarly applicable to the destination physical machine in the fourth embodiment. But the flowchart of FIG. 12 has to be modified to execute steps S70 to S74 described below before the process goes back to step S13 from step S21.

FIG. 17 is a flowchart illustrating a procedure of changing buffer mode by way of example.

(S70) With respect to each of the dirty pages found in step S19, the page status management unit 132 determines how many times the page in question has been recognized as a dirty page since the live migration process was started. This value is referred to as the "dirty count." The dirty count represents the number of times the amount of difference records in an update buffer has exceeded a threshold. The page status management unit 132 manages the dirty counts of individual pages by keeping track of determination results of step S19.

(S71) The system control unit 131 selects one dirty page.

(S72) The system control unit 131 determines whether the dirty count of the selected dirty page exceeds a specified threshold. When the dirty count exceeds the threshold, the process advances step S73. Otherwise, the process skips to step S74.

(S73) The page status management unit 132 changes the current buffer mode of the selected dirty page to a buffer mode that permits omission of write values and updates the buffer mode field of the TLB table 144 accordingly. This action initializes the update buffer with a new buffer mode, thus causing it to store the next coming difference records in a different format.

(S74) The system control unit 131 determines whether step S71 has selected all dirty pages. When all dirty pages are done, the process exits from the routine of FIG. 17 and proceeds to step S13 in FIG. 12. When there are unselected dirty pages, the process goes back to step S71.

The process described above uses dirty counts as a measure of the frequency of write operations on a page. The fourth embodiment may, however, be modified to use other measures. For example, step S70 may be modified to determine a write count of each page if it is possible to count write operations performed on individual pages. Step S72 may then compare a relevant write count with a threshold.

The fourth embodiment has been described above. The proposed information processing system provides the same advantages discussed previously for the second embodiment. The fourth embodiment further sets a buffer mode including write values to less-modified pages and a buffer mode omitting write values to frequently modified pages.

This function offers an improved balance between the load of transmitting difference records and the page dirtying rate.

(e) Fifth Embodiment

This part of the description explains a fifth embodiment. The fifth embodiment proposes an information processing system that dynamically changes the buffer size of each update buffer so as to adjust the balance between the amount of memory space for update buffers and the page dirtying rate.

Larger buffer sizes enable update buffers to accommodate more difference records and thus reduce their page dirtying rates. This means the need for allocating a larger memory space for update buffers. In addition, the utilization ratio of the memory would become worse because of the resulting increase of unused space in some update buffers corresponding to less-modified pages. Smaller buffer sizes, on the other hand, reduce the number of difference records that each update buffer may accommodate and thus raise the page dirtying rates. However, the update buffers may be created with a smaller memory space, and it is possible to avoid degradation of memory utilization ratios.

In view of the above, the fifth embodiment proposes a mechanism for giving initially a smaller buffer size to each update buffer and enlarging update buffers if their pages are frequently modified during live migration. This mechanism alleviates the memory space requirements of update buffers for less-modified pages, while preventing frequently modified pages from easily becoming dirty pages.

The information processing system of the fifth embodiment has the same system configuration discussed previously in FIG. 2. Physical machines in the fifth embodiment are implemented with the same hardware configuration discussed in FIG. 3 and the same software configuration discussed in FIG. 11. Physical machines in the fifth embodiment may use a TLB table similar to the one discussed in FIG. 10. The following part of the description will explain the fifth embodiment using the same reference numerals as in FIGS. 2, 3, 10, and 11.

The foregoing flowchart of source-end process in FIGS. 12 and 13 and the foregoing flowchart of recording modification history in FIG. 14 are similarly applicable to the source physical machine in the fifth embodiment. Also, the foregoing flowchart of destination-end process in FIG. 15 is similarly applicable to the destination physical machine in the fifth embodiment. But the flowchart of FIG. 12 has to be modified to execute steps S80 to S84 described below before the process goes back to step S13 from step S21.

FIG. 18 is a flowchart illustrating a procedure of changing buffer size by way of example.

(S80) With respect to each of the dirty pages found in step S19, the page status management unit 132 determines how many times the page in question has been recognized as a dirty page since the live migration process was started. That is, the dirty count of the page is determined. The dirty count represents the number of times the amount of difference records in an update buffer has exceeded a threshold. The page status management unit 132 manages the dirty counts of individual pages by keeping track of determination results of step S19.

(S81) The system control unit 131 selects one dirty page.

(S82) The system control unit 131 determines whether the dirty count of the selected dirty page exceeds a specified threshold. When the dirty count exceeds the threshold, the process advances to step S83. Otherwise, the process skips to step S84. The threshold may be a fixed value or may be a median value of dirty counts. In the latter case, the population of dirty count samples is formed from the pages that were recognized as dirty pages at least once since the live migration process was started. Alternatively, the mean, mode, or other statistically representative measure of dirty counts may be used in place of the median.

(S83) The page status management unit 132 expands the buffer size of the dirty page selected in step S81. For example, the buffer size may be doubled. Specifically, the page status management unit 132 changes the buffer size field of the TLB table 144, and this change causes the buffer full detection unit 137 to use a larger threshold value in its next determination of a buffer full state.

(S84) The system control unit 131 determines whether step S81 has selected all dirty pages. When all dirty pages are done, the process exits from the process of FIG. 18 and proceeds to step S13 in FIG. 12. When there are unselected dirty pages, the process goes back to step S81.

The process described above uses dirty counts as a measure of the frequency of write operations on a page. The fifth embodiment may, however, be modified to use other measures. For example, step S80 may be modified to determine a write count of each dirty page if it is possible to count write operations performed on individual pages. Step S82 may then compare a relevant write count with a threshold.

The fifth embodiment has been described above. The proposed information processing system provides the same advantages discussed previously for the second embodiment. The fifth embodiment gives a smaller buffer size to less-modified pages and a large buffer size to frequently modified pages. This feature offers an improved balance between the utilization ratio of memory space and the occurrence rate of dirty pages.

(f) Conclusion

Various embodiments and their variations have been discussed above. In one aspect, the proposed techniques reduce the amount of memory data that is to be transferred during the process of live migration of a virtual machine.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program that causes a first computer to perform a procedure comprising:

copying, to a second computer, entire data stored in a page of a memory used by a virtual machine;

creating a buffer area in association with the page;

performing control for detecting a write access to the page and storing a modification history record indicating the write access in the buffer area, each time the write access to the page is executed during a period after the copying, the write access indicating update of part of the entire data stored in the page;

determining whether an amount of modification history records in the buffer area exceeds a threshold after the virtual machine is stopped on the first computer;

recopying updated entire data stored in the page to the second computer without transmitting the modification history records, when the amount of the modification history records is determined as exceeding the threshold; and transmitting the modification history records in the buffer area to the second computer without recopying the updated entire data stored in the page, when the amount of the modification history records is determined as not exceeding the threshold, the updated entire data stored in the page is reproduced in the second computer by using the entire data previously copied and the modification history records.

2. The non-transitory computer-readable storage medium according to claim 1, wherein:

the page is provided in plurality in the memory;

the buffer area is provided in plurality, respectively in association with the plurality of pages; and the procedure further comprises determining when to stop the virtual machine running on the first computer, based on a number of buffer areas having modification history records whose amount exceeds the threshold.

3. The non-transitory computer-readable storage medium according to claim 1, wherein:

the procedure further comprises recopying the updated entire data stored in the page to the second computer while the virtual machine is running on the first computer, when the amount of the modification history records in the buffer area exceeds the threshold.

4. The non-transitory computer-readable storage medium according to claim 1, wherein:

the procedure further comprises transmitting the modification history records in the buffer area to the second computer while the virtual machine is running on the first computer, when the amount of the modification history records exceeds the threshold.

5. The non-transitory computer-readable storage medium according to claim 1, wherein the procedure further comprises changing a format of modification history records to be stored in the buffer area, depending on a modification rate at which data in the page is modified.

6. The non-transitory computer-readable storage medium according to claim 1, wherein the procedure further comprises changing a size of the buffer area, depending on a modification rate at which data in the page is modified.

7. The non-transitory computer-readable storage medium according to claim 1, wherein:

the procedure further comprises transmitting the modification history records in the buffer area to the second computer without recopying the updated entire data stored in the page, while the virtual machine is running on the first computer, when the amount of the modification history records exceeds the threshold.

8. The non-transitory computer-readable storage medium according to claim 1, wherein the procedure further comprises switching a format of modification history records to be stored in the buffer area between a first format and a second format, depending on a modification rate at which data in the page is modified, the first format including a value written in the page, the second format omitting a value written in the page.

9. The non-transitory computer-readable storage medium according to claim 1, wherein the control includes controlling a hardware transaction monitor included in the first computer to detect the write access from a processor included in the first computer to the page and to store the modification history record indicating write access in the buffer area.

10. An information processing apparatus, comprising:

a memory including a page for use by a virtual machine; and a processor configured to perform a procedure including:

copying entire data stored in the page to another information processing apparatus, performing control for detecting a write access to the page and storing a modification history record indicating the write access in a buffer area allocated in association with the page, each time the write access to the page is executed during a period after the copying, the write access indicating update of part of the entire data stored in the page, determining whether an amount of modification history records in the buffer area exceeds a threshold after the virtual machine is stopped on the information processing apparatus;

recopying updated entire data stored in the page to said another information processing apparatus without transmitting the modification history records, when the amount of the modification history records is determined as exceeding the threshold, and transmitting the modification history records in the buffer area to said another information processing apparatus without recopying the updated entire data stored in the page, when the amount of the modification history records is determined as not exceeding the threshold, the updated entire data stored in the page is reproduced in said another information processing apparatus by using the entire data previously copied and the modification history records.

11. A migration method, comprising:

copying, from a first information processing apparatus to a second information processing apparatus, entire data stored in a page of a memory used by a virtual machine running on the first information processing apparatus;

creating a buffer area in association with the page;

detecting a write access to the page and storing a modification history record indicating the write access in the buffer area, each time the write access to the page is executed in the first information processing apparatus during a period after the copying, the write access indicating update of part of the entire data stored in the page;

determining whether an amount of modification history records in the buffer area exceeds a threshold after the virtual machine is stopped on the first information processing apparatus;

recopying updated entire data stored in the page to the second information processing apparatus without transmitting the modification history records and causing the virtual machine to run on the second information processing apparatus using the updated entire data, when the amount of the modification history records is determined as exceeding the threshold; and transmitting the modification history records in the buffer area to the second information processing apparatus without recopying the updated entire data stored in the page and causing the virtual machine to run on the second information processing apparatus using the entire data previously copied and the modification history records, when the amount of the modification history records is determined as not exceeding the threshold.

\* \* \* \* \*